(12) United States Patent
Moore et al.

(10) Patent No.: US 12,515,719 B2
(45) Date of Patent: Jan. 6, 2026

(54) MEASURING THE CONDITION OF A LINEAR ASSET

(71) Applicant: The Net Consulting Group, inc., Framingham, MA (US)

(72) Inventors: Peter Moore, Southborough, MA (US); Jeffery B. Damrell, Scituate, MA (US)

(73) Assignee: The Net Consulting Group, Inc., Framingham, MA (US)

( * ) Notice: Subject to any disclaimer, the term of this patent is extended or adjusted under 35 U.S.C. 154(b) by 477 days.

(21) Appl. No.: 17/957,284

(22) Filed: Sep. 30, 2022

(65) Prior Publication Data

US 2024/0109566 A1 Apr. 4, 2024

(51) Int. Cl.
| | | |
|---|---|---|
| *B61L 23/04* | (2006.01) | |
| *B61K 9/08* | (2006.01) | |
| *B61K 9/10* | (2006.01) | |
| *B61L 25/02* | (2006.01) | |
| *G01C 22/00* | (2006.01) | |
| *G01N 29/04* | (2006.01) | |
| *G01S 13/88* | (2006.01) | |

(52) U.S. Cl.
CPC .............. *B61L 23/042* (2013.01); *B61K 9/08* (2013.01); *B61L 25/025* (2013.01); *B61L 25/026* (2013.01); *G01C 22/00* (2013.01); *G01N 29/04* (2013.01); *G01S 13/885* (2013.01); *G01N 2291/023* (2013.01)

(58) Field of Classification Search
CPC ..................................................... B61L 23/045
See application file for complete search history.

(56) References Cited

U.S. PATENT DOCUMENTS

| 5,978,717 A | 11/1999 | Willem |
| 6,804,621 B1 | 10/2004 | Pedanekar |

(Continued)

FOREIGN PATENT DOCUMENTS

| CN | 112666963 A | 4/2021 |
| CN | 110254468 B | 12/2021 |

(Continued)

OTHER PUBLICATIONS

Khosravi, M., et al., "Reducing the positional errors of railway track geometry measurements using alignment methods: A comparative case study", Measurement, vol. 178, pp. 1-18 (2021).

(Continued)

*Primary Examiner* — Stephanie E Bloss
*Assistant Examiner* — Diana Hancock
(74) *Attorney, Agent, or Firm* — Blueshift IP; Robert Plotkin

(57) ABSTRACT

An automated system measures a plurality of parameters representing conditions of a linear asset while traversing the asset, thereby generating a plurality of data channels representing measurements of the plurality of parameters along the asset. The linear asset may be traversed a plurality of times to obtain additional data within the data channels. For each data channel, measurements obtained from multiple traversals are aligned with each other. Measurements in the data channels are aligned with locations along the linear asset. The resulting aligned data channels may be used to identify locations along the linear asset requiring replacement and/or repair.

25 Claims, 10 Drawing Sheets

(56) References Cited

U.S. PATENT DOCUMENTS

| | | |
|---|---|---|
| 7,130,753 B2 | 10/2006 | Pedanekar |
| 7,680,631 B2 | 3/2010 | Selig, IV et al. |
| 8,209,145 B2 | 6/2012 | Pagliuco et al. |
| 8,914,162 B2 | 12/2014 | Kernwein et al. |
| 9,036,865 B2 | 5/2015 | Haas et al. |
| 9,849,895 B2 | 12/2017 | Mesher |
| 10,501,102 B2 | 12/2019 | Chung et al. |
| 10,521,739 B2 | 12/2019 | Tays et al. |
| 11,169,269 B2 | 11/2021 | Mesher |
| 11,238,212 B1 | 2/2022 | Mueller et al. |
| 11,377,130 B2 * | 7/2022 | Mesher ................. B61L 99/002 |
| 2007/0194099 A1 | 8/2007 | Miller |
| 2010/0194533 A1 | 8/2010 | Sullivan et al. |
| 2018/0339720 A1 * | 11/2018 | Singh ....................... G06T 7/001 |
| 2019/0161095 A1 * | 5/2019 | Veitch ................. G01N 29/265 |
| 2020/0231193 A1 * | 7/2020 | Chen ................. G01N 21/8851 |
| 2020/0302592 A1 * | 9/2020 | Ebersohn ................ G06T 11/60 |
| 2022/0017129 A1 | 1/2022 | Mian |
| 2022/0073113 A1 | 3/2022 | Chung et al. |
| 2022/0391074 A1 | 12/2022 | Apuy |
| 2023/0001968 A1 * | 1/2023 | Cox ................... G01N 21/8851 |
| 2023/0082722 A1 * | 3/2023 | Pickard ................... B61L 25/08 |
| 2024/0109567 A1 * | 4/2024 | Moore ................. B61L 23/042 |

FOREIGN PATENT DOCUMENTS

| | | |
|---|---|---|
| CN | 114379598 A | 4/2022 |
| DE | 102012203483 A1 | 10/2012 |
| EP | 3138754 A1 | 3/2017 |
| IN | 201811046683 A | 6/2022 |
| KR | 101053706 B1 | 8/2011 |
| WO | 2005120924 A1 | 12/2005 |

OTHER PUBLICATIONS

Office Action dated Jul. 2, 2025 for U.S. Appl. No. 17/957,308 (pp. 1-19).

* cited by examiner

MEASURING THE CONDITION OF A LINEAR ASSET

BACKGROUND

Linear assets such as track, pipes, powerlines, tunnels, and roadways need to be measured for condition. A continuous measure typically is conducted while traversing the asset. For practical purposes, a measure typically is recorded every X distance. In the case of rail, X typically is one foot, and 20-30 different channels of data are collected while traversing the asset using many different instruments, such as ultrasonic testing, ground penetrating radar, lidar, laser, cameras, and accelerometers.

The primary reason for obtaining such measurements is to identify locations needing repair or replacement. Therefore, the accuracy of the locations recorded for measurements is critical in order to send work crews to the proper locations. It is difficult, however, to measure and record such locations accurately, and in a way that can be used at a later time to identify and travel to the location in need of repair or replacement. This can be for a variety of reasons, such as any one or more of the following:

- the problem may not be verifiable visually and may require measurement instrumentation;
- the area may not readily allow measurement/testing equipment to be subsequently brought to the location; and
- measurement/testing equipment may not work well at low speeds while attempting to accurately and precisely verify the severity of the problem and its location.

Existing systems use a variety of techniques to attempt to accurately and precisely record location, including GPS and measuring distances from known locations.

Such existing systems, however, have a variety of drawbacks. For example, sometimes GPS is not accurate or precise due to poor connectivity (which blocks GPS signals) and other inherent limitations of the technology. For example, tunnels and areas with tall buildings or tree overhangs can block GPS signals and prevent GPS coordinates from being obtained. Measuring distances from known locations also has limitations, due to accumulated error while traversing the asset. As a result, subsequent measurements may not line up properly to accurately determine trends.

What is needed, therefore, are improved techniques for measuring conditions of a linear asset and for identifying locations on the linear asset that require replacement and/or repair.

SUMMARY

An automated system measures a plurality of parameters representing conditions of a linear asset while traversing the asset, thereby generating a plurality of data channels representing measurements of the plurality of parameters along the asset. The linear asset may be traversed a plurality of times to obtain additional data within the data channels. For each data channel, measurements obtained from multiple traversals are aligned with each other. Measurements in the data channels are aligned with locations along the linear asset. The resulting aligned data channels may be used to identify locations along the linear asset requiring replacement and/or repair.

Other features and advantages of various aspects and embodiments of the present invention will become apparent from the following description and from the claims.

DETAILED DESCRIPTION

In general, embodiments of the present invention are directed to techniques for processing measurements of a linear asset (such as a train track), such as aligning such measurements, identifying measurements which indicate conditions (e.g., defects) in the linear asset, and displaying such measurements and information derived from such measurements.

Figure 1:
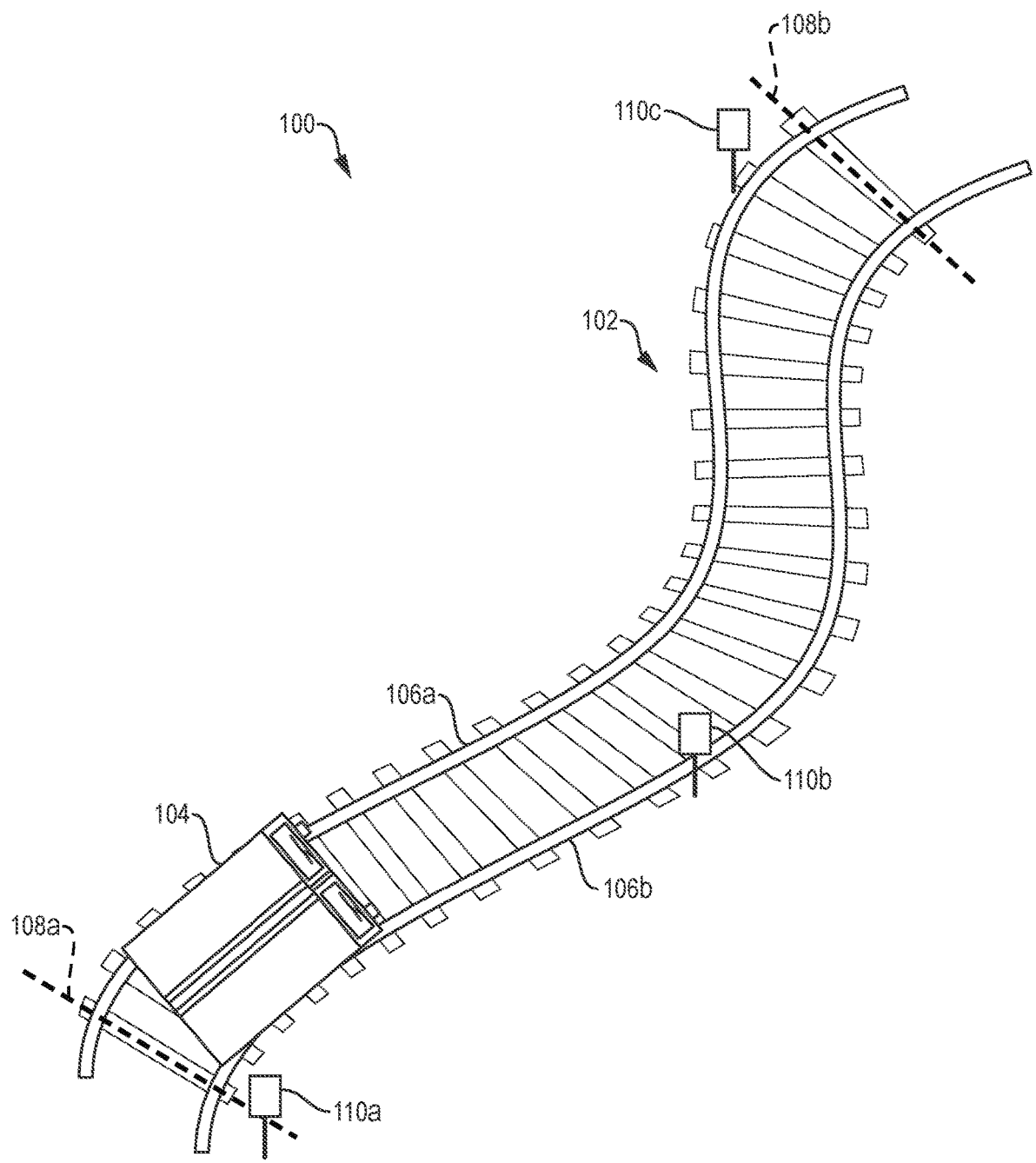
FIG. 1 is an illustration of an environment containing a linear asset according to one embodiment of the present invention.

Referring to FIG. 1, an illustration is shown of an environment 100 containing an example linear asset 102 according to one embodiment of the present invention. The linear asset 102 is shown in a relatively abstract form in FIG. 1 for the purpose of illustrating various features of embodiments of the present invention, rather than to illustrate specific features of any particular linear asset. As this implies, the particular features (e.g., length, width, curvature) of the linear asset 102 shown in FIG. 1 are merely examples and do not constitute limitations of the present invention. Furthermore, the illustration of the linear asset 102 in FIG. 1 may omit certain features of linear assets that may be used in embodiments of the present invention. As merely one example of this, the linear asset 102 is shown in only two dimensions in FIG. 1, whereas linear assets used in embodiments of the present invention may vary along a third dimension (e.g., height).

As implied by the illustration of the linear asset 102 in FIG. 1, a linear asset may, for example, be a train track, road, or other path along which one or more vehicles (e.g., trains)

may travel. This, however, is merely an example and not a limitation of the present invention. More generally, the techniques disclosed herein may be used in connection with any kind of linear asset, whether or not such a linear asset is designed to, or actually does, serve as a path of travel for one or more vehicles.

The linear asset 102 may include one or more components. For example, in the case of a train track, the train track may be a linear asset, which may include components such as one or more rails, wood ties, ballasts, and clips. The term "linear asset" may refer to such a linear asset, including some or all of its components. Alternatively, the term "linear asset" may refer to a subset of such components, such as only the rails of a train track. These are merely examples and do not constitute limitations of the present invention. More generally, the term "linear asset" may, for example, refer to any one or more of such components, in any combination.

The term "linear" in "linear asset" does not imply that a linear asset must have the form of a straight line. Instead, as illustrated by the example linear asset 102 in FIG. 1, some or all of a linear asset may be curved. The term "linear" in "linear asset" instead indicates that locations on a linear asset may be identified using a linear referencing system. As described in more detail below, locations on a linear asset may also be identified using additional, non-linear, referencing systems.

The linear asset 102 may have outer boundaries 106a and 106b. Such outer boundaries 106a-b may, for example, be or be defined by (and possibly be coextensive with) physical features of the linear asset 102, such as two tracks in the case of a train track, but this is not a limitation of the present invention. In fact, even in the case of a train track, embodiments of the present invention may treat the outer boundaries of the linear asset 102 to extend beyond, or otherwise not be defined by, the tracks themselves. More generally, the outer boundaries 106a-b shown in FIG. 1 may, but need not, be defined by physical features of the linear asset 102.

One or more survey modules may traverse some or all of the linear asset 102 to perform various functions disclosed herein, such as sensing values of parameters of the linear asset 102 (and of the environment 100 more generally) to generate data channels representing those parameter values. An example survey module 104 is shown in FIG. 1.

The survey module 104 may take any of a variety of forms. For example, it may be implemented as a vehicle capable of traveling along the linear asset 102, such as on tracks if the linear asset 102 includes tracks. The survey module 104 may, for example, include wheels and/or treads for traveling along and in contact with a surface of the linear asset 102. As another example, the survey module 104 may be airborne (e.g., an unmanned aerial vehicle (UAV), also referred to as a "drone"), which may travel along the linear asset 102 automatically and/or under manual control of a human operator.

As an example, the survey module 104 may travel on the linear asset 102, which implies that the survey module 104 may turn to follow any curves and/or other changes in direction of the linear asset 102 along its path. For example, if the linear asset 102 is a train track, then the survey module 104 may include at least two wheels, which may rest on and be guided by corresponding rails in the train track as the survey module 104 traverses the linear asset 102. If the survey module 104 is airborne, the survey module 104 need not travel "on" the linear asset 102, but may still turn to follow any curves and/or other changes in direction of the linear asset 102 along its path, as the survey module 104 flies above the linear asset 102.

As another example, the survey module 104 may travel alongside, but (partially or entirely) outside the boundaries of the linear asset 102. In such a case, the survey module 104 may still turn to follow any curves and/or other changes in direction of the linear asset 102 along its path, even as the survey module 104 travels outside the boundaries of the linear asset 102. As one example of this, the survey module 104 may use an exterior edge of the linear asset 102 as a guide (whether by, for example, maintaining physical contact with the exterior edge of the linear asset 102 or by using optical and/or electromagnetic signals as a guide to the edge of the linear asset 102), as the survey module 104 travels along, and outside of, the linear asset 102 along its path.

The survey module 104 may perform certain functions disclosed herein while the survey module 104 is in motion, e.g., in motion along the linear asset 102. For example, as the survey module 104 travels along the linear asset 102, the survey module 104 may gather measurements of one or more parameters of the linear asset 102 at each of a plurality of places along the linear asset 102. As another example, the survey module 104 may remain at a particular place (i.e., not be in motion) while the survey module gathers measurements of one or more parameters of the linear asset 102 at each of a plurality of places along the linear asset 102. As one example of this, the survey module 104 may include a camera mounted on swivel, and may capture images of a plurality of places on the linear asset 102 by swiveling the camera through a plurality of angles and capturing images of different places on the linear asset 102 at each of those angles, while the survey module 104 remains at a fixed location.

The survey module 104 may use any of the techniques described above in various combinations. For example, the survey module 104 may travel on and within one segment of the linear asset 102, and travel outside of another segment of the linear asset 102, as the survey module 104 performs functions disclosed herein (e.g., obtaining measurements of values of parameters of the linear asset 102).

As will be described in more detail below, the survey module 104 may make multiple "passes" of one or more segments of the linear asset 102 to perform functions disclosed herein for each such pass. Each such pass, also referred to herein as a "traversal," includes using the survey module 104 to gather measurements of values of one or more parameters of a plurality of locations in the linear asset 102. Such a plurality of locations may, for example, be within a particular segment of the linear asset 102. An example segment is shown in FIG. 1 as being delineated by a segment start 108a and a segment end 108b. The segment start and end 108a-b may, but need not, be defined by or otherwise correspond to physical features of the linear asset 102. As one example, the segment start 108a may be a known location of a first train station and the segment end 108b may be a known location of a second train station. As another example, the segment start 108a may be a known location of a first monument and the segment end 108b may be a known location of a second monument. As used herein, the term "monument" refers to any physical object (such as a sign or pole) which is located at a particular place on or near a linear asset, and which can be used to indicate or mark a particular location along the linear asset.

FIG. 1 also illustrates examples of a plurality of places 110a-c at which embodiments of the present invention may obtain measurements. Although three places 110a-c are shown in FIG. 1 for ease of illustration, in practice there may be any number of such places, which may, for example, number in the hundreds or thousands. Some or all of the places 110*a-c* may, for example, correspond to and be indicated by physical features on, along, or near the linear asset 102, such as monuments. When embodiments of the present invention obtain parameter and location measurements (as described in more detail below), such embodiments may, for example, obtain such measurements by sensing properties of such physical features. Such sensing of a physical feature may, for example, be performed without the active involvement of the physical feature (e.g., by using a camera to capture one or more images of a monument) and/or with the active involvement of the physical feature (e.g., by an active RFID tag in the physical feature emitting a signal, which is received by an embodiment of the present invention). These are merely examples of the places 110*a-c*, and do not constitute limitations of embodiments of the present invention. More generally, the places 110*a-c* in FIG. 1 illustrate locations at which embodiments of the present invention may obtain measurements of properties of the linear asset and of locations along the linear asset 102.

As an example, the survey module 104 may traverse the segment of the linear asset 102 defined by the segment start and end 108*a-b* once in a particular direction and gather measurements of one or more parameters at least some of the places (e.g., some or all of the places 110*a-c*) in that segment of the linear asset 102. This would be an example of one traversal of the particular segment of the linear asset 102. If the survey module 104 were again to traverse that particular segment of the linear asset 102 (in the same or opposite direction) and gather new measurements of one or more parameters at least some of places traversed during the first pass of the linear asset 102, this would constitute an example of a second traversal of the particular segment of the linear asset 102. The survey module 104 may make any number of passes of any segment(s) of the linear asset 102, or of the linear asset 102 in its entirety.

Although only the survey module 104 is shown herein, embodiments of the present invention may use a plurality of survey modules to perform the functions disclosed herein. As this implies, any reference herein to the survey module 104 should be understood to refer to one or more survey modules for performing the functions disclosed herein. Such survey modules may, for example, perform their functions in sequence and/or in parallel with each other.

Similarly, although only the linear asset 102 is shown herein, embodiments of the present invention may be implemented in connection with a plurality of linear assets, which may be disjoint from each other, and which may be of different types (e.g., train tracks of different types, or a train track and a road). As this implies, any reference herein to the linear asset 102 should be understood to refer to one or more linear assets.

Having introduced certain concepts and terminology that will be helpful for understanding certain aspects of embodiments of the present invention, examples of particular embodiments of the present invention will now be described in more detail.

Figure 2:
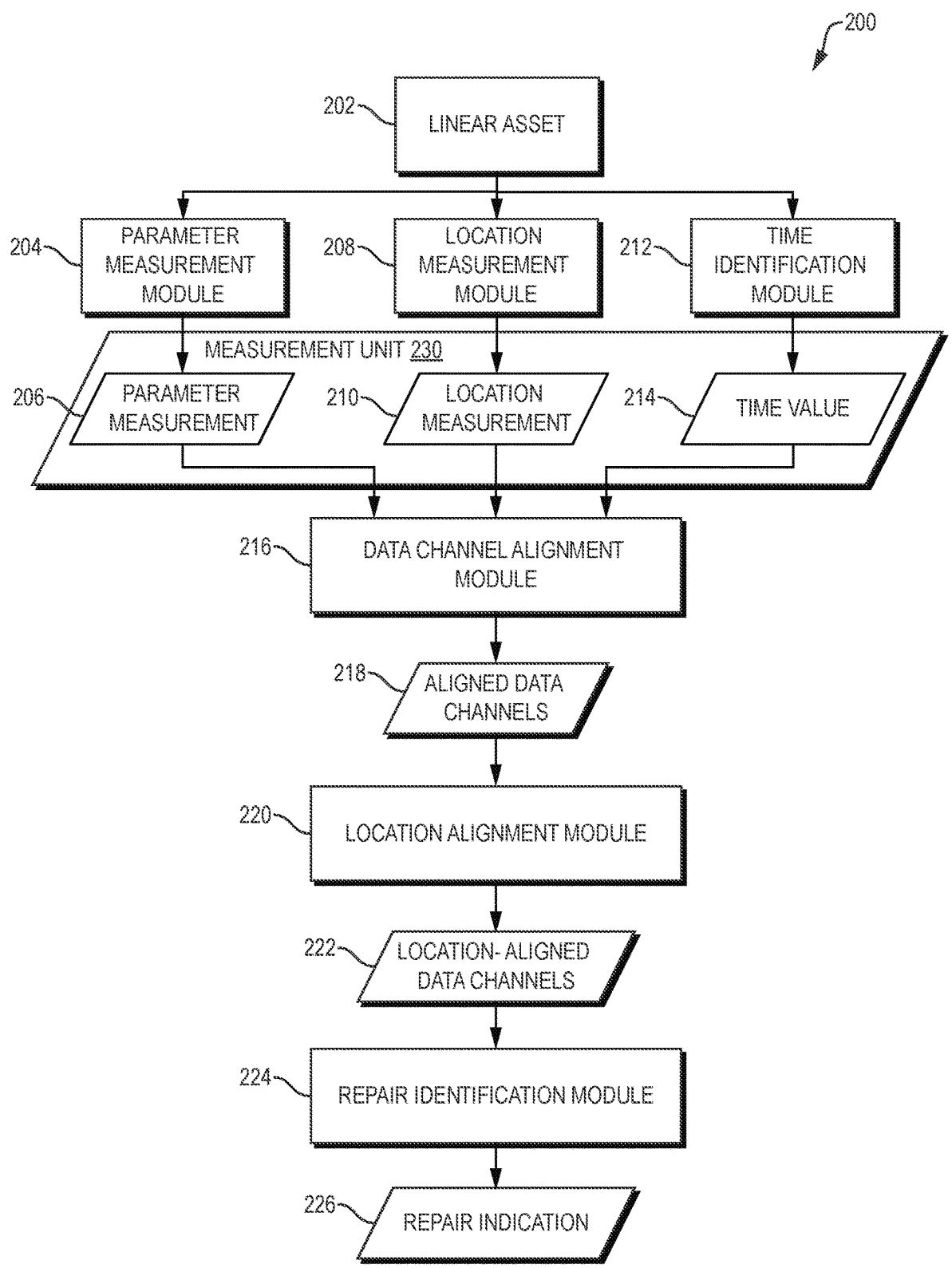
FIG. 2 is a dataflow diagram of a system for measuring the condition of a linear asset according to one embodiment of the present invention.
Figure 3:
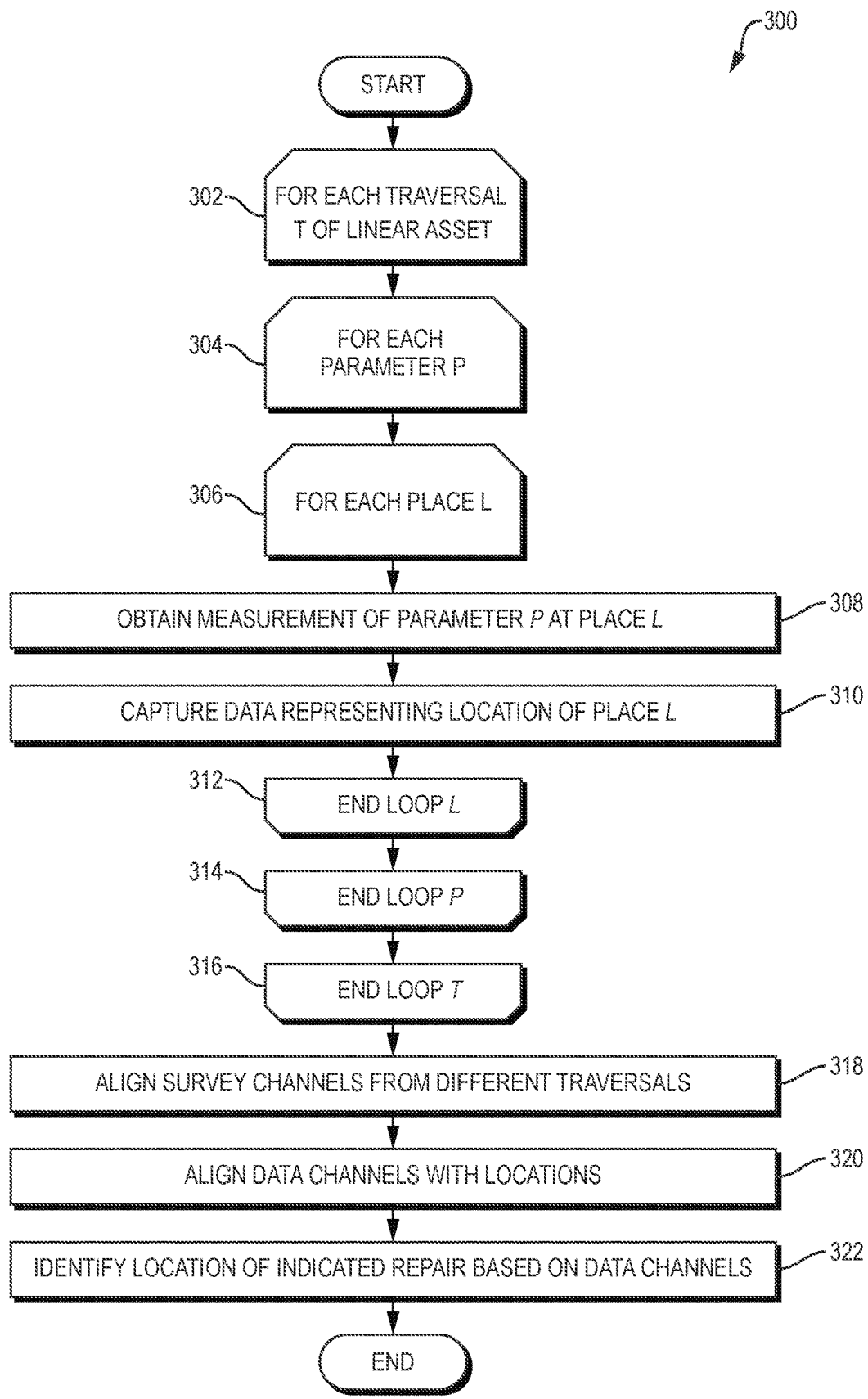
FIG. 3 is a flowchart of a method that is performed by the system of FIG. 2 according to one embodiment of the present invention.

Referring to FIG. 2, a dataflow diagram is shown of a system 200 for measuring the condition of a linear asset (such as the linear asset 102 of FIG. 1) according to one embodiment of the present invention. Referring to FIG. 3, a flowchart is shown of a method 300 that is performed by the system 200 of FIG. 2 according to one embodiment of the present invention.

The system 200 includes a linear asset 202, which is illustrated abstractly in FIG. 2 for ease of illustration. The linear asset 202 may, for example, be the linear asset 102 of FIG. 1. Although the linear asset 202 is shown abstractly in FIG. 2, in practice the linear asset has a particular physical form that includes a plurality of places and that is subject to measurement.

The system 200 also includes a parameter measurement module 204. As described in more detail below, the parameter measurement module 204 may measure a parameter of the linear asset 202 to produce a corresponding parameter measurement (also referred to herein as a "parameter value" or a "value of a parameter"). The parameter measurement module 204 may make a plurality of measurements of a particular parameter of the linear asset 202, such as by making those measurements at a plurality of different times and/or at a plurality of places on the linear asset 202, thereby producing a plurality of corresponding parameter measurements. Similarly, the parameter measurement module 204 may measure a plurality of parameters of the linear asset 202, thereby producing a plurality of corresponding parameter measurements. As this implies, although only the parameter measurement 206 is shown in FIG. 2 for ease of illustration, that parameter measurement 206 may instead include a plurality of parameter measurements, each of which may be associated with (e.g., contain) data representing any one or more of the following in connection with the measured parameter: a measured value of the measured parameter; a time at which the parameter measurement was performed; and a location on the linear asset 202 that corresponds to the measured value of the measured parameter (e.g., a location of the parameter measurement module 204 at the time that it measured the measured parameter).

The parameter measurement module 204 may take any of a variety of forms and measure any of a variety of parameters in any of a variety of ways. As just a few examples, the parameter measurement module 204 may, for example:

use ultrasonic testing to measure the parameter and generate the parameter measurement 206, which may represent, for example, a size of condition, a type of condition, and/or a severity of condition;

use ground penetrating radar to measure the parameter and generate the parameter measurement 206, which may represent, for example, a depth of water, clay, rock, equipment, conditions, or other object(s);

include a camera, which may capture one or more images (e.g., of one or more portions of the linear asset 202) to measure the parameter and generate the parameter measurement 206;

use an accelerometer to measure the parameter and generate the parameter measurement 206, which may represent, for example, forces applied on any one or more of three axes, in any combination.

Although in some examples disclosed herein, parameter values are obtained by using one or more sensors to sense those parameter values from the linear asset 202, this is merely an example and does not constitute a limitation of the present invention. As another example, the parameter measurement module 204 may obtain one or more values of a parameter from input obtained from a human or a computer (e.g., a software application). As one example of this, the age of the linear asset 202 (or of a portion or component of the linear asset 202), such as may be represented by an age of manufacture or installation, may be stored in digital data in a software application, database, or other digital data store. For example, such a digital data store may store ages of each of a plurality of components of the linear asset 202. Such ages are examples of values of an "age" parameter. The parameter measurement module 204 may obtain such ages by reading them from the digital data store in which they are stored.

As merely some additional examples, the parameter measurement module 204 may measure one or more parameters to generate measurements including the parameter measurement 206 by receiving and processing any one or more of the following signals, in any combination: light signals, sound signals, cellular telephone signals, WiFi signals, Bluetooth signals, radar signals, laser signals, altimeter signals, and signals generated by one or more signal-generating tags (e.g., RFID tags). Such signals may, for example, represent a location (e.g., of the survey module 104) and may, therefore, be considered to be the location measurement 210, in addition to or instead of the parameter measurement 206. Merely as some examples:

- sound signals may be received by the parameter measurement module 204 and be identified by the parameter measurement module 204 as representing screeching while rounding a corner on a track, and the system 200 may process those sound signals to obtain an estimate of a location where curved tracked is located;
- light signals may be received by the parameter measurement module 204 and be identified by the parameter measurement module 204 as representing light received when exiting a tunnel, and the system 200 may process those light signals to obtain an estimate of a location where a tunnel exit is located; and
- Wi-Fi signals may be received by the parameter measurement module 204, and the system 200 may draw an inference that those signals are received from a location of a station platform.

The system 200 also includes a location measurement module 208, which may measure a location of a place on the linear asset 202 (e.g., at a particular time), thereby producing a location measurement 210 representing the measured location of the place. As used herein, the term "place" refers to a physical portion of the linear asset 202, and the term "location" refers to one or more values representing a position of a corresponding place in space. For example, if the linear asset 202 is a train track, one place may be a segment of a rail in that train track, and a location of that place may be GPS coordinates of that segment of the rail. The location measurement 210 may, for example, include data representing a location of the place measured by the location measurement module 208, and may also include other data relating to the measured place, such as a time at which the location measurement was performed.

The location measurement module 208 may measure the location of the place and generate the location measurement 210 in any of a variety of ways, such as by, for example:

- using GPS technology to measure the location of the place and generate the location measurement 210 to represent the resulting GPS coordinates;
- measuring the location of the place as a distance from one or more reference locations (e.g., from a starting point of the survey module 104), such as by using an odometer, and generating the location measurement 210 as a value that is equal to, or otherwise based on, that distance;
- reckoning a known location using at least one sensor and generating the location measurement 210 based on that reckoning;
- measure a value that can be cross-referenced with a known location, such as by measuring a curve in the linear asset 202 of a certain radius, type, length, etc. This can be cross referenced with the original engineering drawings which indicate the exact location.

The location measurement module 208 may measure locations of a plurality of places on the linear asset 202, such as by making those measurements as the location measurement module 208 moves along the linear asset 202. As this implies, although only the location measurement 210 is shown in FIG. 2 for ease of illustration, that location measurement 210 may instead include a plurality of location measurements representing measured locations of a plurality of places on the linear asset.

The system 200 also includes a time identification module 212, which may identify a time, such as time at which the parameter measurement module 204 measured a parameter of the linear asset 202 to generate the parameter measurement 206, or a time at which the location measurement module 208 measured a location of the linear asset 202 to generate the location measurement, thereby producing a time value 214. The time identification module 212 may, for example, use any of a variety of well-known techniques for producing the time value 214, such as by using a clock, which may, for example, be synchronized to an external time source or another computer sensor or system, such as via satellite or the Internet. Although not shown in FIG. 2, the parameter measurement module 204, location measurement module 208, and other components of the system 200 may receive the time value 214 to generate and store any time values disclosed herein. Although only the time value 214 is shown in FIG. 2 for ease of illustration, the time identification module 212 may identify a plurality of times, thereby producing a plurality of time values as output, such as by identifying each of a plurality of times at which the location measurement module 208 measures each of a plurality of locations on the linear asset 202.

Although the parameter measurement module 204, location measurement module 208, and time identification module 212 are shown in FIG. 2 as being distinct from each other, any combination of some or all of those modules 204, 208, and 212 may be implemented within distinct devices or within a single device. As one example, the survey module 104 of FIG. 1 may include the parameter measurement module 204, the location measurement module 208, and the time identification module 212.

Consider now a particular place $L_1$ on the linear asset 202 at a particular time $T_1$:

- The parameter measurement module 204 may measure a particular parameter $P_1$ of the linear asset 202 at place $L_1$ and time $T_1$ to produce a measurement of parameter $P_1$ at place $L_1$ and time $T_1$. This measurement is an example of the parameter measurement 206.
- The location measurement module 208 may measure the location of place $L_1$ to produce a measurement of that location. This measurement is an example of the location measurement 210.
- The time identification module 212 may identify the time at which the parameter measurement and/or the location measurement was obtained. This time is an example of the time value 214.

This combination of a parameter measurement, location measurement, and time value, where the location measurement represents the location of the parameter measurement, and where the time value represents the time at which the parameter measurement and/or the location measurement were obtained, is referred to herein as a measurement unit 230. As the above implies, the system 200 may generate and store a plurality of measurement units, e.g.:

- for the same parameter $P_1$, at different places and times; and/or
- for one or more additional parameters $P_2/P_3$, etc., at a plurality of combinations of places and times.

Although measurement units are shown herein as including a parameter measurement, a location measurement, and a time value, a measurement unit need not include all such components. As a particular example, a measurement unit may include a parameter measurement and a location measurement, but not a time value.

Figure 4:
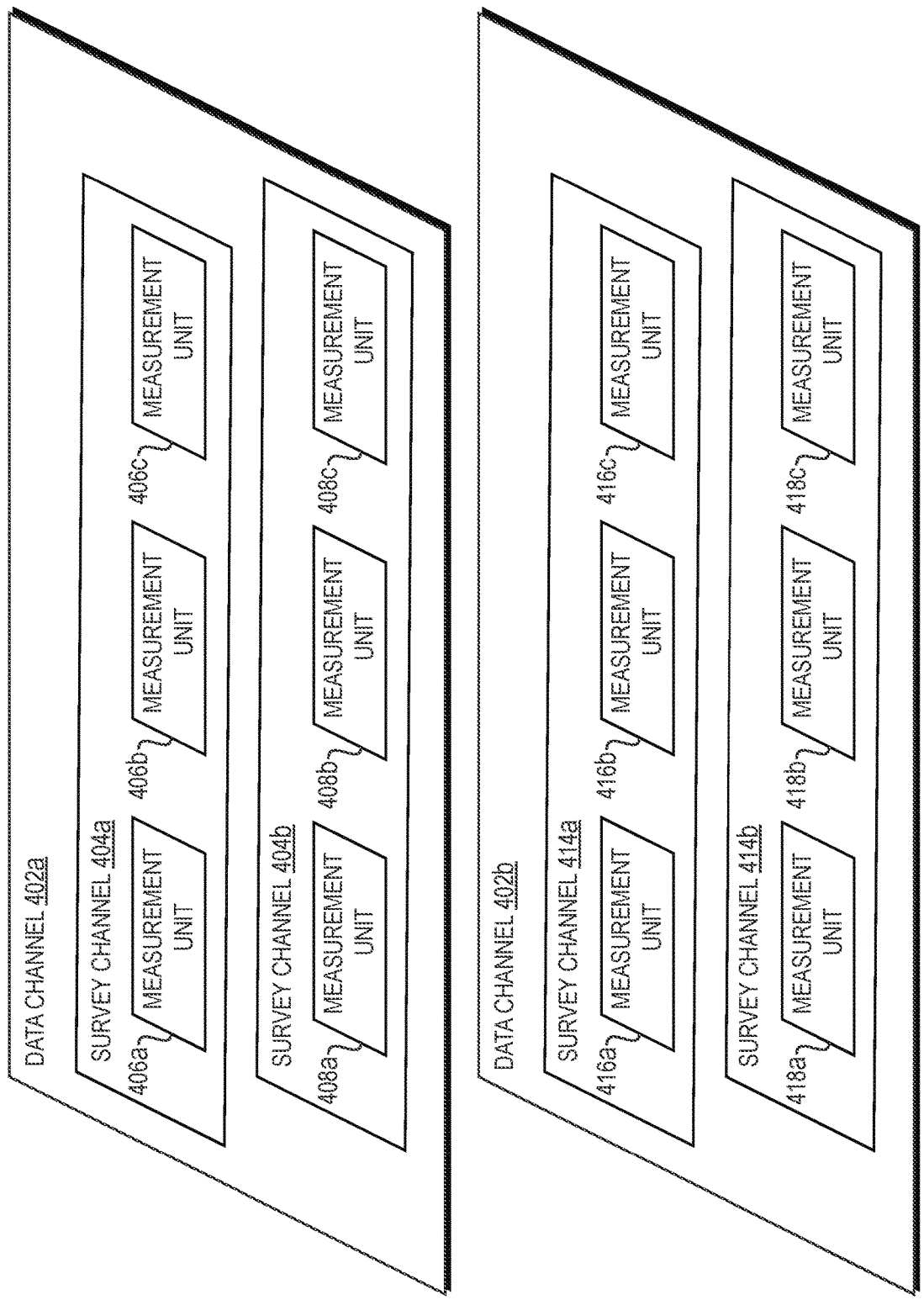
FIG. 4 is an illustration of a plurality of data channels implemented according to one embodiment of the present invention.

Referring now to FIG. 4, an illustration is shown which illustrates the concepts of "survey channels" and "data channels" herein. As used herein, the term "survey channel" refers to a plurality of measurements of a particular parameter at a plurality of places and times, during a particular traversal of the linear asset 202 (e.g., a first traversal by the survey module 104). For example, consider a first traversal of the linear asset 102 by the survey module 104, in which the survey module 104 obtains parameter measurements of a first parameter $P_1$ at locations 110a-c. FIG. 4 shows a first survey channel 404a, which includes a plurality of measurement units 406a-c. In this particular example:

measurement unit 406a includes a measurement of parameter $P_1$ at location 110a at a time $T_1$ during the first traversal of the linear asset 102;

measurement unit 406b includes a measurement of parameter $P_2$ at location 110b at a time $T_2$ during the first traversal of the linear asset 102; and measurement unit 406c includes a measurement of parameter $P_1$ at location 110c at a time $T_3$ during the first traversal of the linear asset 102.

Now consider a second traversal of the linear asset 202 (e.g., a second traversal of the linear asset 102 by the survey module 104). FIG. 4 shows a second survey channel 404b, which includes a plurality of measurement units 408a-c. In this particular example:

measurement unit 408a includes a measurement of parameter $P_1$ at location 110a at a time $T_4$ (which is later than times $T_1$-$T_3$) during the second traversal of the linear asset 102;

measurement unit 408b includes a measurement of parameter $P_1$ at location 110b at a time $T_5$ (which is later than times $T_1$-$T_3$) during the second traversal of the linear asset 102; and measurement unit 408c includes a measurement of parameter $P_1$ at location 110c at a time $T_6$ (which is later than times $T_1$-$T_3$) during the second traversal of the linear asset 102.

FIG. 4 also shows a data channel 402a, which corresponds to parameter $P_1$, and which includes both of the survey channels 404a-b. As this example illustrates:

a survey channel may include a plurality of measurement units corresponding to a plurality of measurements of a particular parameter obtained during a particular traversal of a linear asset;

different survey channels may include measurement units corresponding to measurements of the same parameter obtained during different traversals of a linear asset; and a data channel may include one or more survey channels, where different survey channels within the data channel may correspond to measurements of the data channel's parameter obtained during different traversals of a linear asset.

An additional data channel 402b is shown in FIG. 4 for purposes of example. The data channel 402b corresponds to a parameter $P_2$, which differs from parameter $P_1$. The data channel 402b includes a plurality of survey channels 414a-b, each of which includes one or a plurality of measurement units. More specifically, survey channel 414a includes measurement units 416a-c, and survey channel 414b includes measurement units 418a-c. The general descriptions of data channels, survey channels, and measurement units provided above apply equally to the data channel 402b, survey channels 414a-b, and measurement units 416a-c and 418a-c.

The particular numbers of data channels 402a-b, survey channels 404a-b and 414a-b, and measurement units 406a-c, 408a-c, 416a-c, and 418a-c shown in FIG. 4 are merely examples and do not constitute limitations of embodiments of the present invention. Embodiments of the present invention may include a greater or lesser number of any of such elements, in any combination. Any two survey channels may have the same or different number of measurement units as each other. Any two data channels may have the same or different number of survey channels as each other.

As described above, the system 200 may include a plurality of parameter measurement modules, each of which may perform the functions disclosed herein in connection with the parameter measurement module 204. Two or more of those parameter measurement modules may measure different parameters than each other. For example, the system 200 may include a plurality of parameter measurement modules, each of which measures a distinct parameter. As another example, the system 200 may include a plurality of parameter measurement modules, some or all of which measure the same parameter as each other. Such possibilities may be combined with each other; i.e., the system 200 may include a plurality of parameter measurement modules which measure the same parameter as each other, and one or more additional parameter measurement modules which measure a different parameter than the plurality of parameter measurement modules.

As a particular example, the system 200 may include a plurality of survey modules of the kind shown as survey module 104 in FIG. 1. Each such survey module may include one or more parameter measurement modules, location measurement modules, and time identification modules. Any of the functions disclosed herein as being performed by the parameter measurement module 204, location measurement module 208, and time identification module 212 may be performed by such a plurality of survey modules. Different survey modules may include parameter measurement modules which measure the same and/or different parameters as each other, in any combination. For example, a survey module X may include a parameter module for measuring a parameter A, while a survey module Y may not include any parameter module for measuring parameter A. Survey module Y may include a parameter module for measuring a parameter B, and survey module X may or may not include a parameter module for measuring parameter B. All of these are merely examples to illustrate that any number and variety of parameter measurement modules, location measurement modules, and time identification modules may be distributed among any number of survey modules and/or other devices for performing the functions disclosed herein.

Outputs of the parameter measurement module 204 (e.g., parameter measurement 206), location measurement module 208 (e.g., location measurement 210), and time identification module 212 (e.g., time value 214) may be stored locally (e.g., within the same device (e.g., the survey module 104) that contains the corresponding module) and/or remotely (e.g., outside of the device (e.g., the survey module 104) that contains the corresponding module). For example, the parameter measurement module 204 may store the parameter measurement 206 in a local memory (e.g., in a memory within the survey module 104). Additionally or alternatively, the parameter measurement module 204 may transmit, over a network, the parameter measurement 206 to a remote computer for storage, and then delete the parameter measurement 206 locally. Such storage options may, for example, be combined with each other in any of a variety of ways. For example, the parameter measurement module 204 may store the parameter measurement 206 locally for some amount of time, and then transfer the parameter measurement 206 to a remote computer for storage, and then delete the parameter measurement 206 locally.

An example of the operation of the system 200 will now be described by reference to the method 300 of FIG. 3. The method 300 enters a loop over each of a plurality of traversals T of the linear asset 202 (FIG. 3, operation 302). The method 300 enters a loop over each of a plurality of parameters P to be measured (FIG. 3, operation 304). The method 300 enters a loop over each of a plurality of places L (FIG. 3, operation 306).

As will be described in more detail below, the method 300 may measure each of the parameters P at each of the plurality of locations L, within each of the plurality of traversals T. Such measurements may, for example, be performed by the survey module 104 (which, as described above, may be implemented using one or a plurality of survey modules) as it traverses the linear asset 102.

The particular nesting order of the loops of traversals T, parameters P, and locations L shown in FIG. 3 is merely an example and does not constitute a limitation of the present invention. For example, the outermost loop (shown in FIG. 3 as looping over the traversals T) may instead loop over the parameters P or the locations L. As this implies, the middle loop (shown in FIG. 3 as looping over the parameters P) may instead loop over the traversals T or the locations L. Similarly, the innermost loop (shown in FIG. 3 as looping over the locations L) may instead loop over the traversals T or the parameters P. Those having skill in the art will appreciate how to implement such alternative loop nesting orders, which may be combined with each other in various ways.

Furthermore, the method 300 need not perform a measurement of every parameter during every traversal, or at every location. For example, during any particular traversal, the method 300 may only perform measurements of some of the parameters P and not others. As another example, at any particular location, the method 300 may only perform measurements of some of the parameters P and not others. These are merely examples to illustrate the more general principle that the method 300 may perform measurements of the parameters P at a variety of locations, may measure some or all of the parameters P at any of the locations L, need not measure all of the parameters P at all of the locations L, and may take multiple measurements of any particular parameter at any particular location.

Even if not explicitly stated herein:
any of the parameter measurements disclosed in connection with the method 300 of FIG. 3 may be performed by one or more parameter measurement modules of the kind shown as parameter measurement module 204 in FIG. 2;
any of the location measurements disclosed in connection with the method 300 of FIG. 3 may be performed by one or more location measurement modules of the kind shown as location measurement module 208 in FIG. 2; and
any of the time identifications disclosed in connection with the method 300 of FIG. 3 may be performed by one or more time identification modules of the kind shown as time identification module 212 in FIG. 2.

Any reference herein to measuring a parameter or identifying a time "at" a particular location, "in connection with" a particular location, "for" a particular location, or the like, should be understood to include performing that parameter measurement in any way which enables a location associated with the parameter measurement to be identified. Some examples of these include:

The parameter measurement module 204 may identify its own location at a particular time as the location of the parameter measurement 206 at that time. For example, if the survey module 104 includes the parameter measurement module 204, the location measurement module 208, and the time identification module 212, the parameter measurement module 204 may measure a value of a particular parameter while the survey module 104 is located at a particular location at a particular time, in which case: (1) the time identification module 212 may identify the particular time and output the particular time within the time value 214; (2) the location measurement module 208 may identify the location of the survey module 104 at the particular time and output that location within the location measurement 210; and (3) the parameter measurement module 204 may produce the parameter measurement 206 representing the measured value of the particular parameter at the location represented by the location measurement 210 and at the time represented by the time value 214.

The parameter measurement module 204 may identify a location of a portion of the linear asset 202 at a particular time, which may differ from the location of the parameter measurement module 204 (e.g., the location of the survey module 104 containing the parameter measurement module 204) at that particular time, as the location of the parameter measurement 206 at that time. This may occur if, for example, the parameter measurement module 204 measures a parameter of the linear asset 202 at a distance, such as by using an image rendering sensor (e.g., a camera, laser sensor, RADAR sensor, or LIDAR sensor) to measure a parameter of a portion of the linear asset 202 that is located at a different location than the parameter measurement module 204 at a particular time.

At the current place L, the parameter measurement module 204 obtains a measurement 206 of the current parameter P at place L (FIG. 3, operation 308). The location measurement module 208 may capture data representing a location of the current place L and generate the location measurement 210 to represent that location (FIG. 3, operation 310). Although not shown in FIG. 3, the time identification module 212 may identify a time at which the parameter measurement module 204 obtained the measurement 206 of the current parameter P at place L, and/or a time at which the location measurement module 208 generated the location measurement 210.

The method 300 repeats operations 308 and 310 for some or all of the places L (FIG. 3, operation 312), and for some or all of the parameters P at some or all of the places L (FIG. 3, operation 314), and for some or all of the traversals T (FIG. 3, operation 316).

As should be clear from the above, a result of performing operations 304-314 for a single one of the traversals $T_1$ is to generate, for each of the plurality of parameters P, a corresponding survey channel containing a plurality of measurement units (e.g., measurements and corresponding locations and (optionally) corresponding times). For example, consider a first parameter $P_1$ and a second parameter $P_2$. Performing operations 304-314 for a single one of the traversals $T_1$ may generate: (1) a first survey channel, corresponding to parameter $P_1$ and traversal $T_1$, containing a plurality of measurements of parameter $P_1$ corresponding to a plurality of places (and their locations, and optionally the times of such measurements) along the linear asset 202; and (2) a second survey channel, corresponding to parameter $P_2$ and traversal $T_1$, containing a plurality of measurements of parameter $P_2$ corresponding to a plurality of places (and their locations, and optionally the times of such measurements) along the linear asset 202. The first survey channel may be within a first data channel corresponding to parameter $P_1$ (which may contain one or more other survey channels corresponding to parameter $P_1$), and the second survey channel may be within a second data channel corresponding to parameter $P_2$ (which may contain one or more other survey channels corresponding to parameter $P_2$). The same may be extended to any number of parameters and corresponding survey channels (and the data channels containing those survey channels).

Extending this to the plurality of traversals T, performing operations 302-316 may generate, for each of the plurality of parameters P, a corresponding survey channel for each of the traversals T, where each such survey channel includes a plurality of measurements (and corresponding locations and/or times) obtained during that traversal. In other words, performing operations 302-316 may generate a data channel for each of the plurality of parameters P, wherein each of the data channels contains one or a plurality of survey channels corresponding to the data channel's parameter. Such data channels are referred to herein as the "original data channels." As the description above implies, performing operations 302-316 may generate multiple original survey channels for a single parameter, where each of the multiple survey channels was generated during a distinct traversal of the linear asset 202.

Different data channels may be stored within the same or different software systems (e.g., database systems). For example, the system 200 may capture a first data channel and store that data channel in a first database system, and may capture a second data channel and store that data channel in a second database system. As described elsewhere herein, each measurement in such a data channel may be timestamped using its corresponding time value 214. The system 200 may use any of a variety of techniques to synchronize two or more such data channels using the data channels' time stamps. For example, the system 200 may determine that the time stamp associated with a first measurement in a first data channel falls within some predetermined threshold of the time stamp associated with a second measurement in a second data channel. In response to such a determination, the system 200 may treat the first and second measurements as having been obtained at the same location for purposes of some or all of the functions disclosed herein.

As noted above, the places L may, but need not, be the same for all parameters P or for all traversals T. For example, at any of the places L, the method 300 may obtain measurements of some, but not all, of the parameters P. Similarly, the method 300 may obtain measurements of different parameters at different places. As another example, the method 300 may obtain measurements of the parameters P at one set of places during a first one of the traversals T, and at a different set of places during a second one of the traversals T.

As mentioned above, the method 300 may obtain measure parameters and locations in operations 302-316 using one or more survey modules, such as the survey module 104. For example, as the survey module 104 (which may contain some or all of the parameter measurement module 204, the location measurement module 208, and the time identification module 212) moves along the linear asset 102 (or otherwise moves through space, whether or not along the linear asset 102), the survey module 104 may obtain the parameter measurements in operation 308 and/or capture the location data in operation 310. Further examples of this will be described in more detail below.

The survey module 104 may, for example, include one or more data capture modules onboard. Each such data capture module may measure at least one corresponding parameter to generate a data channel corresponding to each such data channel. For example, the survey module 104 may include a first data capture module which may measure a plurality of values of a first parameter (e.g., at a plurality of times and locations) to generate a first data channel, and also include a second data capture module which may measure a plurality of values of a second parameter (e.g., at a plurality of times and locations) to generate a second data channel.

Such first and second data capture modules may be integrated with, or separate from, each other, either entirely or partially. For example, a single device (e.g., smartphone) may include both the first and second data capture modules, which may share at least some of the same hardware (e.g., a camera) with each other. As another example, the first and second data capture modules may be contained within two physically distinct devices, e.g., two devices contained within separate housings and not sharing any hardware with each other (although such devices may or may not be in communication with each other, such as via a wired or wireless connection). A single data capture module may capture a plurality of data channels containing measurements of a plurality of parameters.

Within a particular data channel, the location measurements of different survey channels within that data channel (i.e., data measured for the data channel's parameter during different traversals of the linear asset 202) may not be aligned with each other. To address this problem, the system 200 also includes a data channel alignment module 216, which may receive the original data channels generated in operations 302-316 and align the survey channels within each of the original data channels with each other, thereby generating a set of aligned data channels 218 as output (FIG. 3, operation 318). Within each of the aligned data channels 218, the survey channels (i.e., data from multiple traversals of the linear asset 202) are more closely aligned with each other than the survey channels within the original data channels.

Such alignment may be performed in any of a variety of ways. For example, the data channel alignment module 216 may analyze each of the original data channels. Within each data channel, the data channel alignment module 216 may start at the beginning of a survey channel in the data channel, and analyze the first X measurement units in the survey channel, where X may be any number. If the first X measurements exceed a threshold, then the data channel alignment module 216 may shift the data and create a tie down point. The data channel alignment module 216 then repeats this process for the next measurement in the survey channel and shifts all data locations further than the last aligned/synchronized tied down position. The data channel alignment module 216 allows for the data between consecutive tie down points to be stretched or shrunk. This will result in a signature match for each channel of data. A detailed explanation of some examples of how alignment may be performed is provided in Mandi Khosravi et al., "Reducing the positional errors of railway track geometry measurements using alignment methods: A comparative case study," Measurement, Measurement, Volume 178, pp. 109383-109400 (2021).

As described above, measurement units within survey channels may include, for example, measurements of signals, such as light signals (e.g., images, lidar) and/or sound signals (e.g. radar) obtained at a plurality of locations and time. As part of aligning the survey channels in each of the original data channels with each other in operation 318, the data channel alignment module 216 may, for example, determine whether and/or the extent to which features of such signals (e.g., pulses of light or sound) align with each other. For example, the data channel alignment module 216 may, as part of the alignment operation 318, determine whether and/or the extent to which flashes of light in two or more survey channels within a particular data channel align with each other.

As part of aligning the original data channels in operation 318, the data channel alignment module 216 may generate, for each of some or all of the original data channels, a level of certainty associated with that data channel. The data channel alignment module 216 may, for example, generate the level of certainty for a particular survey within a particular data channel based on a degree of alignment and the number of other data channels whose data from the same survey are in alignment with the particular survey within the particular data channel, where a greater degree and number of aligned data channels results in a higher level of certainty. In other words, the level of certainty may be an increasing function of the number of data channels that are in alignment with each other.

Lack of alignment among multiple survey channels within each of the original data channels is not the only kind of lack of alignment that may exist within the original data channels. In addition, one or more of the original data channels may lack alignment (to varying degrees) with the plurality of location measurements within the original data channels (of which the location measurement 210 shown in FIG. 2 is an example).

To address this problem, the system 200 also includes a location alignment module 220, which receives the aligned data channels 218 as input, and aligns parameter measurements within the aligned data channels 218 with the locations of those measurements, thereby producing location-aligned data channels 222 (FIG. 3, operation 320).

The alignment of data channels with locations by the location alignment module 220 in operation 320 may include aligning the measurements in the data channels with the plurality of places based on data obtained from known characteristics of the plurality of places at known locations. Examples of such known characteristics include, for example, a plurality of monuments at the plurality of places (e.g., one monument at each of the plurality of places). For example, the parameter measurement module 204 may use a camera to capture a plurality of images of the plurality of monuments, and the location alignment module 220 may align the measurements in the data channels with the plurality of places using the plurality of images of the plurality of monuments. Furthermore, the location measurement module 208 may measure locations of each of the plurality of monuments (e.g., by using GPS technology to measure the GPS coordinates of each monument). The location measurement module 208 may, additionally or alternatively, record the true distance of pairs of monuments from each other, such as by subtracting an odometer reading (e.g., of the survey module 104) at one monument from an odometer reading at another monument. The location alignment module 220 may align the measurements in the data channels with the plurality of places using the plurality of images of the plurality of monuments and the locations of the plurality of monuments.

As another example, the known characteristics may include a plurality of signal-generating tags (e.g., RFID tags) at the plurality of places, and the parameter measurement module 204 may use a signal-generating tag reader (e.g., an RFID tag reader) to read a plurality of signals (e.g., RFID signals) from the plurality of signal-generating tags (e.g., one or more signals from each of the plurality of signal-generating tags). Such signals, read from one or more signal-generating tags, are an example of data obtained from known characteristics of the plurality of places at known locations. The location alignment module 220 may align the measurements in the data channels with the plurality of places using the plurality of signal-generating tag signals. Furthermore, the location measurement module 208 may measure locations of each of the signal-generating tags. The location alignment module 220 may align the measurements in the data channels with the plurality of places using the plurality of signal-generating tag signals and the locations of the plurality of signal-generating tags.

More specifically, the location alignment module 220 may start at the beginning of a particular data channel, e.g., with the first X measurements in the data channel, where X may be any number. Starting at the beginning of this set of X measurements (i.e., with the first measurement in the set of X measurements and proceeding to each subsequent measurement in the set of X measurements), if the current measurement matches a known physical location (e.g., if the current measurement has one or more parameter values matching parameter values of a known physical place, e.g., a monument or a signal-generating tag or degree of curvature measured by an accelerometer or gyroscope), then the location alignment module 220 may shift (change) the location of the current measurement to the location of the known physical place and create a tie down point. The location alignment module 220 may repeat this process for subsequent measurements in the data channel. Each time the location alignment module 220 identifies a match between a measurement in the data channel and a known physical place, the location alignment module 220 may shift (change) the location of that measurement area extending back to the last tie down point to the location of the matching known physical location. The location alignment module 220 allows for the data between tie down points to be stretched or shrunk. This will result in a signature match for each data channel.

Although, in FIGS. 2 and 3, the alignment of data channels with each other (by the data channel alignment module 216 in operation 318) is shown as being performed before the alignment of the data channels with locations (by the location alignment module 220 in operation 320), this is merely an example and does not constitute a limitation of the present invention. For example, the order of the alignment operations 318 and 320 may be swapped, such that the original data channels are aligned first with locations by the location alignment module 220 to produce location-aligned data channels, which are then aligned with each other by the data channel alignment module 216 to produce aligned data channels. Furthermore, in some embodiments of the present invention, alignment operation 318 is performed but not alignment operation 320; in other embodiments of the present invention, alignment operation 320 is performed but not alignment operation 318.

As the above description implies, any reference here to operations being performed using the location-aligned data channels 222 should be understood to be equally applicable to operations being performed on the aligned data channels 218, regardless of the order in which the data channel alignment module 216 and the location alignment module 220 perform their respective functions, and regardless of whether the system 200 includes both the data channel alignment module 216 and the location alignment module 220.

For each of some or all of the places at which the parameter measurement module 204 generates parameter measurements, the location measurement module 208 may measure and store one or both of the following: (1) a linear measurement of the location of that place (e.g., using an odometer to obtain a distance of the place from a reference location, e.g., a previous monument or a train station), and (2) an absolute location of that place (e.g., using GPS technology to obtain GPS coordinates of the place). As described elsewhere, the parameter measurements that are generated and stored for each such place may include, for example, one or images of a monument at that place, one or more signal-generating tag signals obtained (e.g., from a monument) at that place, etc. The system 200 may use such data to crosswalk between linear measurements of a location of a place and absolute measurements of a location of a place, so that if the system 200 receives an absolute location (e.g., GPS coordinates) as input, the system 200 may, based on the data disclosed herein, generate output representing a linear location (e.g., distance from a reference location) that corresponds to the same (or sufficiently similar) place as the input absolute location. Conversely, if the system 200 receives a linear location as input, the system 200 may, based on the data disclosed herein, generate output representing an absolutely location that corresponds to the same (or sufficiently similar) place as the input linear location. In either case, the system 200 may also output additional data associated with the output (absolute or linear) location, such as any parameter values associated with that location, e.g., images of monuments located at that location.

The system 200 also includes a repair identification module 224, which receives the location-aligned data channels 222 as input, and identifies, based on the location-aligned data channels 222, at least one location on the linear asset 202 at which a repair is indicated (FIG. 3, operation 322). The repair identification module 224 may generate repair indication output 226 representing the indicated repair(s).

The repair identification module 224 may generate any of a variety of data based on data disclosed herein, such as the location-aligned data channels 222. For example, the repair identification module 224 may identify, generate and store data representing, one or more (actual or predicted) conditions on (or associated with) the linear asset 202, based on any data disclosed herein (such as the location-aligned data channels). Although all defects are conditions, not all conditions are defects. For example, some conditions may represent problems that do not rise to the level of a defect. As another example, some conditions may represent improvements to the linear asset 202. Data representing a specific condition is referred to herein as a "condition data unit." A plurality of condition data units is referred to herein as "condition data." A condition data unit generated and/or stored by embodiments of the present invention may include, for example, any one or more of the following, in any combination in connection with the condition represented by the condition data unit:

- a line (e.g., train line) on which the condition is located;
- a track (e.g., train track) on which the condition is located;
- a priority of the condition;
- a severity of the condition;
- a location of the condition;
- a condition type of the condition;
- a problem type of the condition;
- a root cause type of the condition; and
- a symptom type of the condition.

The location of the condition may be represented in any of a variety of ways, such as by using a start location and an end location of the condition, thereby indicating that the condition occurs between the start location and the end location. The start and/or end location may, for example, be represented using any kind of location referencing system, such as a linear referencing system. The start location and/or end location may include a combination of a marker and offset. For example, the start location may include both a start marker identifier and a start offset (where the start location is equal to the location of the start marker identified by the start marker identifier, plus the start offset), and the end location may include both an end marker identifier and an end offset (where the end location is equal to the location of the end marker identified by the end marker identifier plus the end offset). The start marker may, for example, be a first place (e.g., a first monument along the linear asset 202) and the end marker may, for example, be a second place (e.g., a second monument along the linear asset 202). The start marker identifier may take any of a variety of forms, such as a unique numerical identifier of the start marker or a location of the start marker in a location referencing system. The end marker identifier may take any of a variety of forms, such as a unique numerical identifier of the end marker or a location of the end marker in a location referencing system.

The repair identification module 224 may, for example, generate the priority of the condition based on any one or more of the condition's condition type, problem type, root cause type, and associated symptom type, in any combination. A condition data unit representing a particular condition may, for example, include data representing any one or more of the following in any combination:

- one or more parameter measurements associated with the condition;
- one or more locations of the condition, such as a start location and an end location of the condition on the linear asset 202, or a set of locations of the condition, represented in any coordinate system;
- one or more times of the condition (e.g., a time corresponding to each of the condition's parameter measurement(s) and/or location(s));
- a condition type of the condition;
- a problem type of the condition;
- a root cause type of the condition;
- a symptom type of the condition; and a priority of the condition.

The priorities of conditions may be represented in any way which enables the priorities of different conditions to be ranked as greater than, less than, or equal to each other. As one example, each condition's priority may have a numerical value (e.g., an integer value within a particular range), thereby enabling one condition's priority to be ranked as greater than, less than, or equal to another condition's priority by comparing the numerical values of those priorities to each other. As one simple example, a priority value of 1 may represent a low priority, a priority value of 2 may represent a medium priority, and a priority value of 3 may represent a high priority.

The parameter measurement(s), location(s), and time value(s) associated with a condition (and stored within the condition's condition data unit) may, for example, be at least part of the basis for other data within the condition's condition data unit (e.g., the condition's condition type, condition type, problem type, root cause type, symptom type, and/or priority). For example, the condition type of a condition, as stored within the condition's condition data, may have been generated based (in whole or in part) on the condition's parameter measurement(s), location(s), and/or time value(s), which may also be stored within the condition's condition data unit. As this implies, one or more locations of a condition, as stored within the condition's condition data unit, may be locations resulting from the alignment operations performed in operations 318 and/or 320 of the method 300 of FIG. 3.

Condition data may, but need not, be stored separately from the location-aligned data channels. For example, in some embodiments of the present invention, data (e.g., measurement units) within the location-aligned data channels 222 are modified and/or associated with data (e.g., in the form of metadata) which enables the data within the location-aligned data channels 222 to perform the functions of condition data disclosed herein.

Embodiments of the present invention may search for and find groupings of data which have locations that are sufficiently close to each other and which have other matching attributes, whether or not such groupings of data were originally generated and stored using different location referencing systems. Such groupings of data may, for example, be groupings of measurement units within the location-aligned data channels 222 and/or groupings of condition data units.

Locations in different data channels may be represented in the same or different location referencing systems as each other. For example, when the system 200 generates the original data channels as described above, the system 200 may store locations of a first one of the original data channels according to a first location referencing system (e.g., a linear location referencing system which measures a distance of each measurement's location from a reference location, such as a distance of the measurement's location on the linear asset 202 from a reference location on the linear asset 202), and may store locations of a second one of the original data channels according to a second location referencing system (e.g., GPS coordinates of each measurement's location). Any such locations, referenced according to the two different location referencing systems, may carry through to data derived from the original data channels, such as the location-aligned data channels and any condition data generated by the system 200. In this particular example, the two location referencing systems include a linear location referencing system and a non-linear location referencing system.

Such use of different location referencing systems to store locations in different data channels is merely an example and does not constitute a limitation of the present invention. Some or all of the original data channels may include locations which are represented in the same location referencing system as each other.

The system 200 may identify two units of data (e.g., two measurement units, or two condition data units) whose locations satisfy a proximity criterion relative to each other. The two identified units of data may, for example, be within the same data channel as each other, or within different data channels. For example, the system 200 may identify a location of a first condition (represented by a first condition data unit) having a location that is no more than some predetermined distance from a location of a second condition (represented by a second condition data unit). The system 200 may perform such identification for one or a plurality of pairs of data units (e.g., measurement units or condition data units). Each such pair represents a pair of features (e.g., measurements or conditions) which are within the predetermined distance of each other.

More generally, such as by using the techniques just described, the system 200 may identify any subset of data (e.g., a subset of measurement units in the location-aligned data channels 222, or a subset of condition data units in the condition data), where all of the data units in the subset satisfy the proximity criterion in relation to each other.

From within this set of data units satisfying the proximity criterion relative to each other, the system 200 may identify a subset of data units which satisfy one or more similarity criteria relative to each other. Any such similarity criterion may, for example, be a location-related similarity criterion (e.g., being in a high stress area, such as a tight radius curve) or a non-location similarity criterion (e.g., a particular priority or problem type). Any two data units (e.g., measurement units in the location-aligned data channels 222 or condition data units in the condition data) may satisfy the similarity criterion if the two data units are sufficiently similar to each other in some specified way. Examples of these include two data units which satisfy any of the following criteria, either individually, or in any combination:

have associated time values which differ from each other by less than some threshold amount, thereby satisfying a temporal criterion relative to each other;
have the same condition type;
have the same problem type;
have the same root cause type;
have the same symptom type; or have the same priority type.

The resulting set of data units is referred to herein as the "result set." If the system 200 uses only the proximity criterion to generate the result set, then the data units in the result set satisfy the proximity criterion. If the system 200 uses both the proximity criterion and one or more similarity criteria to generate the result set, then the data units in the result set satisfy both the proximity criterion and the similarity criterion(s). As described above, any similarity criterion may be location-related or non-location-related.

It should be appreciated that the process described above may result in zero, one, or a plurality of result sets. For example, the process described above may result in two result sets, each of which includes its own plurality of data units (e.g., measurement units and/or condition data units), where the plurality of data units in the first result set satisfy the proximity criterion and the similarity criterion relative to each other, and where the plurality of data units in the second result set satisfy the proximity criterion and the similarity criterion relative to each other. Such result sets may, for example, represent two clusters of conditions that are spaced apart from each other, but where conditions within each cluster are close to each other. The first and second result sets may be disjoint or may overlap to some extent.

Furthermore, the process described above for generating result set(s) may be performed a first time to produce one or more first result sets, and the proximity criterion and/or similarity criterion may then be modified, and the process described above for generating result set(s) may be repeated, thereby generating one or more second result sets, which may differ from the first result sets. In this way, modifying the proximity criterion and/or similarity criterion may be used to perform different queries on the data (e.g., the location-aligned data channels and/or condition data) to produce different search results.

As described above, a data unit (e.g., a condition data unit) may include a "priority" attribute. The repair identification module 224 may generate and/or modify the value of a condition data unit's "priority" attribute based on the contents of one or more result sets. For example, the repair identification module 224 may increase the value of the "priority" attribute of one or more data units in the result set based on the number of data units in the result set, where the greater the number of data units in the result set, the greater the increase in the value of the "priority" attribute. In other words, the repair identification module 224 may increase the value of the "priority" attribute of one or more data units in the result set based on an increasing function of the number of data units in the result set. The criteria that are used to select data units for inclusion in the result set may be selected in any appropriate manner to produce a result set containing data units which are related to each other in any desired way. For example, those criteria may be selected to produce a result set containing only data units from a particular region of a particular linear asset.

As another example, the repair identification module 224 may maintain lists of attributes which, when they occur in close proximity to each other, indicate a high likelihood of a significant condition, even if the occurrence of such attributes individually does not indicate a high likelihood of a significant condition. Some particular examples of attributes which, when they occur in close proximity to each other (e.g., within some portion of the linear asset 202 or within some predetermined distance of each other), may be treated by the repair identification module 224 as indicating a high likelihood of a significant condition, include, for example, more than some predetermined number of:
  bad ties in succession;
  missing fasteners in succession;
  regions of track with a gage that is wider than some predetermined amount;
  regions of track that are curved by more than some predetermined amount; and
  water conditions (e.g., pooling water).

For example, a first such attribute list may identify a first plurality of attributes, and a second such attribute list may identify a second plurality of attributes, where the first and second plurality of attributes differ from each other. The repair identification module 224 may determine whether the result set has all of the attributes in the first plurality of attributes, regardless of how those attributes are distributed among data units in the result set. For example, if there are three attributes in the first plurality of attributes, then the result set has all of the attributes in the first plurality of attributes in any of the following cases:
  a first data unit in the result set has the first attribute, a second data unit in the result set has the second attribute, and a third data unit in the result set has the third attribute;
  a first data unit in the result set has the first and second attributes, and a second data unit in the result set has the third attribute;
  a first data unit in the result set has the first, second, and third attributes.

In response to determining that the result set has all of the attributes in the first plurality of attributes, the repair identification module 224 may increase the value of the "priority" attribute of some or all of the data units in the result set.

Regardless of how, and how many times, the system 200 generates the result set(s), the system 200 may generate output representing the result set(s). Such output is an example of the repair indication output 226, because the result set may indicate a location at which one or more components of the linear asset 202 requires repair, or at least should be inspected for potential repair.

As described above, each condition data unit may include values of a plurality of parameters corresponding to the condition represented by that condition data unit, such as the condition's line, track, priority, and location (e.g., start marker identifier, start offset, end marker identifier, and end offset). Embodiments of the present invention may use such condition data to generate output representing the conditions represented by the condition data, in ways which are visually company and which visually indicate parameters of the conditions, such as their locations and priorities.

Figure 5:
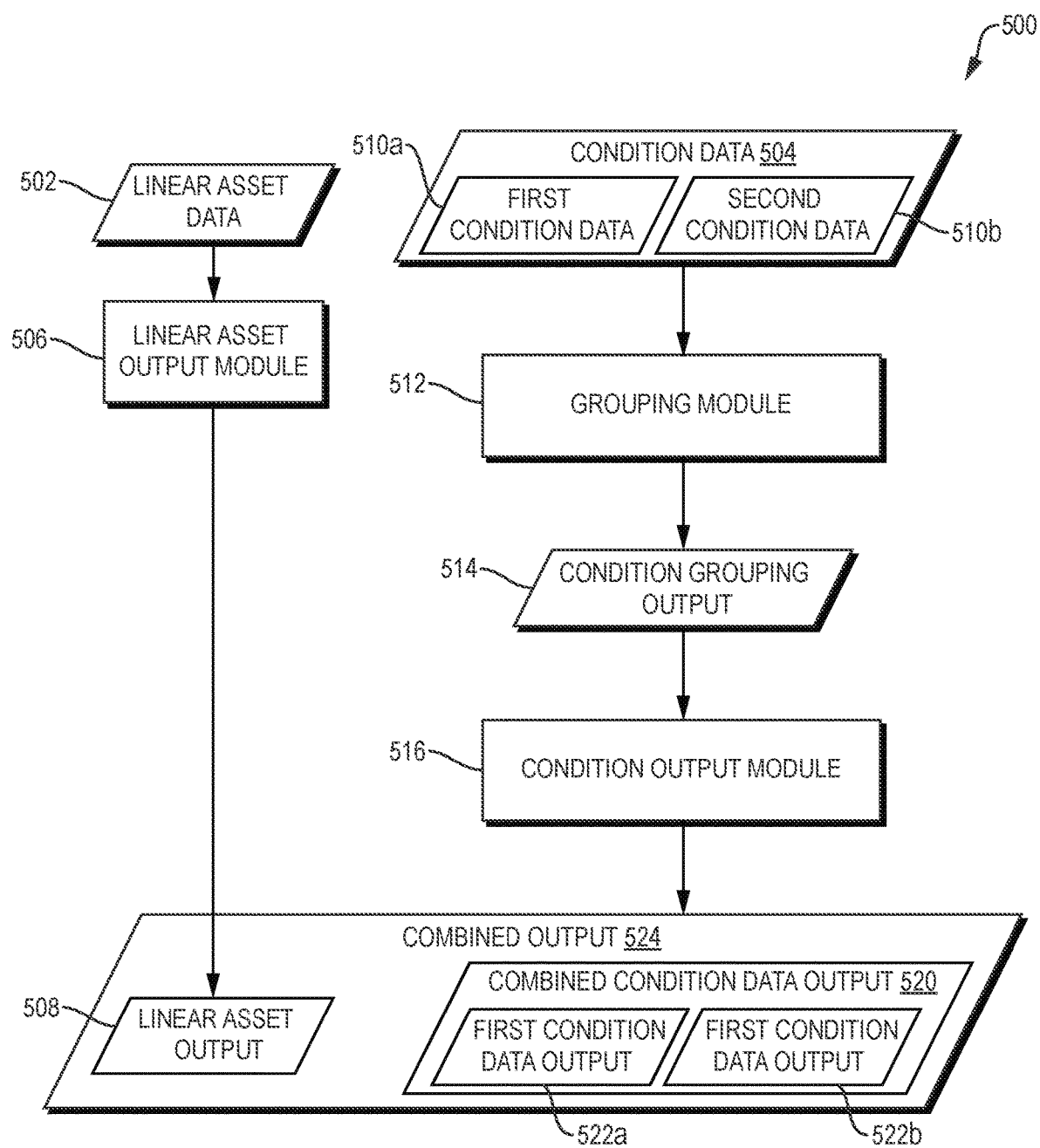
FIG. 5 is a dataflow diagram of a system for generating output representing a plurality of conditions of a linear asset according to one embodiment of the present invention.
Figure 6:
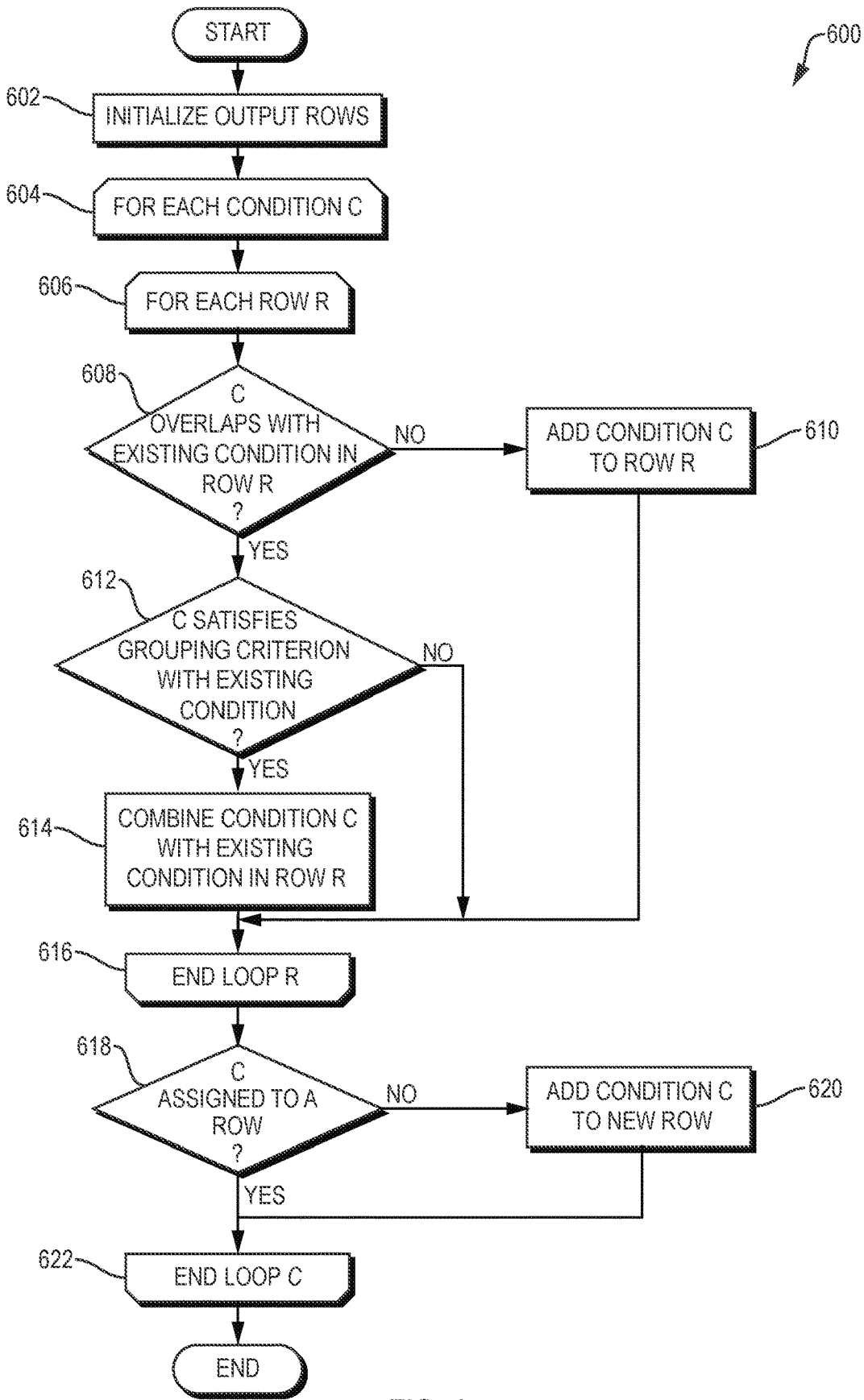
FIG. 6 is a flowchart of a method that is performed by the system of FIG. 5 according to one embodiment of the present invention.

For example, FIG. 5 is a dataflow diagram of a system 500 for generating output (referred to herein as combined output 524) representing a plurality of conditions of the linear asset 202 according to one embodiment of the present invention. FIG. 6 is a flowchart of a method 600 that is performed by the system 500 of FIG. 5 according to one embodiment of the present invention. The combined output 524 includes linear asset output 508, representing some or all of the linear asset 202, and combined condition data output 520 representing a plurality of conditions. In the particular example of FIG. 5, the combined condition data output 520 includes first condition data output 522a, representing a first condition, and second condition data output 522b, representing a second condition. In practice, the linear asset output 508 may represent one or a plurality of linear assets, and the combined condition data output 520 may represent any number of conditions.

Figure 7A:
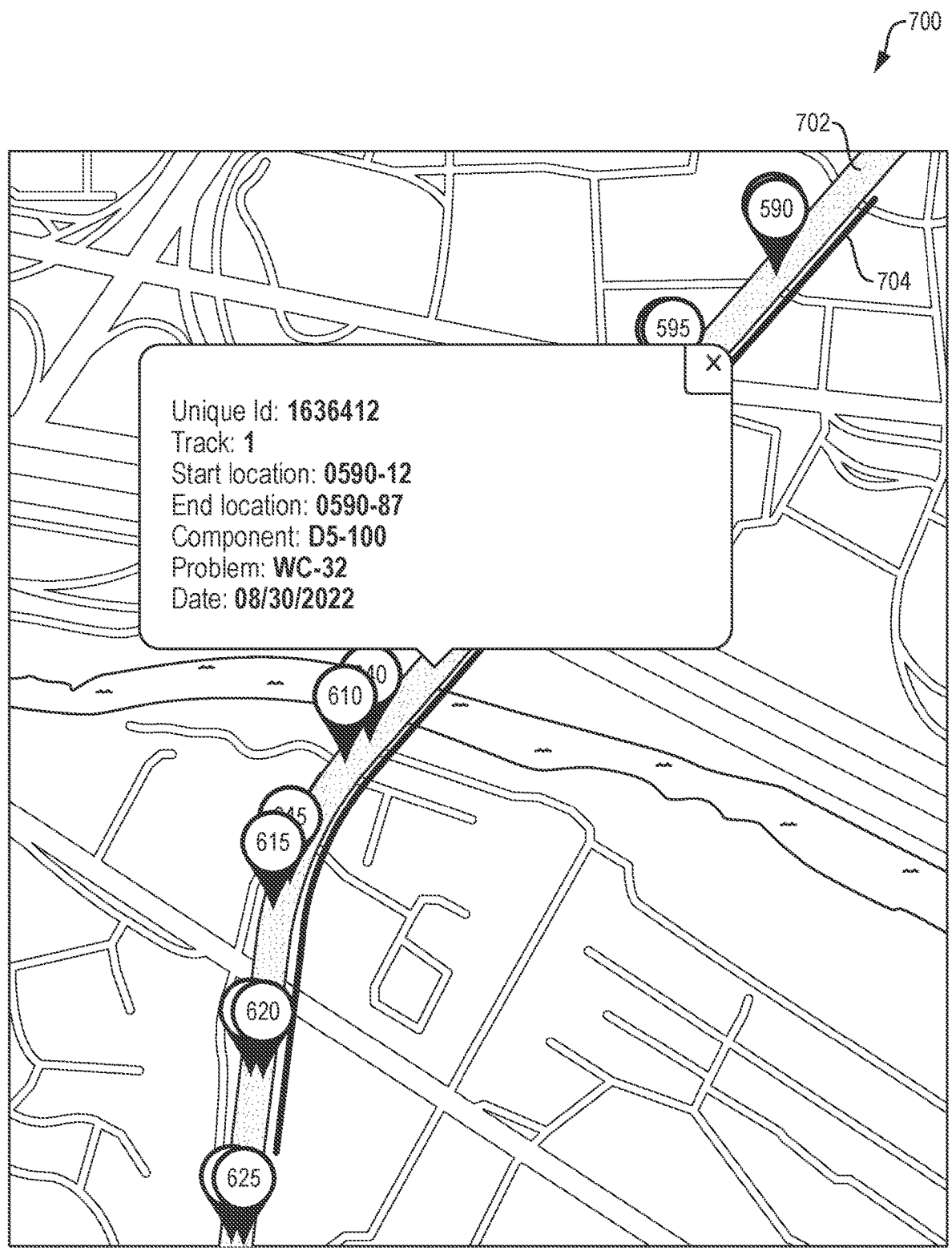
FIG. 7A is an illustration of display output representing a condition according to one embodiment of the present invention.

Referring to FIG. 7A, an illustration is shown of output 700, which an example of the combined output 524. The output 700 in FIG. 7A includes output 702, which represents an example of the linear asset 202. As such, output 702 in FIG. 7A is an example of the linear asset output 508 in FIG. 5. The output 700 in FIG. 7A also includes output 704, which represents an example of the combined condition data output 520. The output 702 may, for example, represent a train track, and the output 704 may, for example, represent a single condition or a plurality of contiguous and/or grouped conditions along the train track.

Figure 7B:
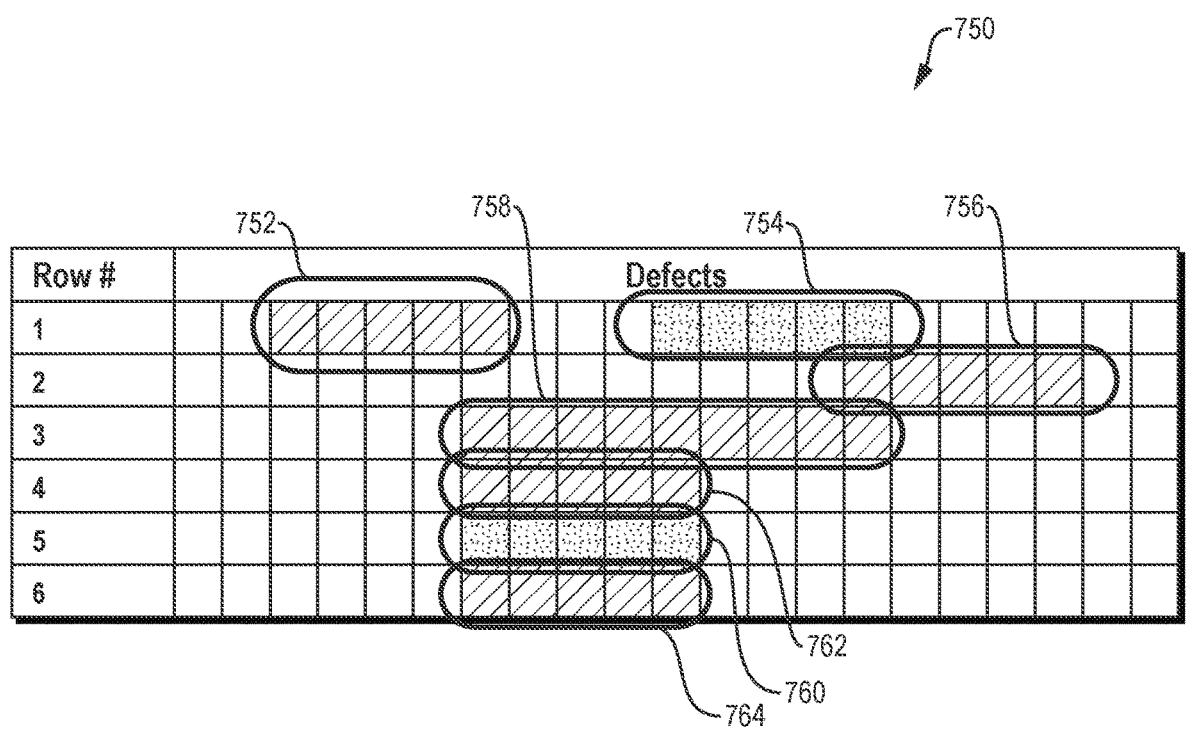
FIG. 7B is an illustration of display output representing a plurality of conditions according to one embodiment of the present invention.

Referring to FIG. 7B, an illustration is shown of display output 750 representing a plurality of conditions according to one embodiment of the present invention. The output 750 includes output 752, output 754, output 756, output 758, output 760, output 762, and output 764, representing a plurality of conditions. As will become clear from the description below, each of the outputs 752, 754, 756, 758, 760, 762, and 764 may represent one or a plurality of conditions. The display output 750 may use different visual characteristics to different conditions to illustrate different parameters (and/or different values of the same parameter) of the illustrated conditions. For example, in the particular example of FIG. 7B, outputs 752, 756, 758, 760, and 764 correspond to conditions having a first priority (e.g., low priority), and therefore are illustrated using a first shade, while outputs 754 and 762 correspond to conditions having a second priority (e.g., medium priority), and therefore are illustrated using a second shade.

As will also be described in more detail below, the system 500 of FIG. 5 and the method 600 of FIG. 6 may display visual output representing different conditions in a visually compact manner. In some embodiments of the present invention, this includes displaying some linearly-overlapping conditions in different rows than each other, in order to stack those conditions over each other (e.g., vertically), while grouping some linearly-overlapping conditions together within the same row as each other, and while displaying non-linearly-overlapping conditions as separate (e.g., noncontiguous) visual output within the same row as each other.

For example, the display output 750 of FIG. 7B includes six rows (labeled 1-6 in FIG. 7B), each of which includes visual output representing one or more conditions. The horizontal axis in the display output 750 represents linear coordinates in a linear coordinate system, where each cell represents a range of linear coordinates, and where linear coordinates increase from left to right. As this implies, the range of linear coordinates corresponding to any particular cell C is greater than the range of linear coordinates corresponding to the cell to the left of cell C (i.e., cell C−1). As this further implies, any two cells in the same column of different rows correspond to the same (or at least overlapping) linear coordinates in the linear coordinate system.

More specifically, in the display output 750:
Row 1 includes output 752, which represents a first condition (or a plurality of grouped conditions) having a low priority, and output 754, which represents a second condition (or a plurality of grouped conditions) having a medium priority. In the example of FIG. 7B, outputs 752 and 754 are noncontiguous.
Row 2 includes output 756, which represents a third condition (or a plurality of grouped conditions) having a low priority.
Row 3 includes output 758, which represents a fourth condition (or a plurality of grouped conditions) having a low priority.
Row 4 includes output 760, which represents a fifth condition (or a plurality of grouped conditions) having a low priority.
Row 5 includes output 762, which represents a sixth condition (or a plurality of grouped conditions) having a medium priority.
Row 6 includes output 768, which represents a seventh condition (or a plurality of grouped conditions) having a low priority.

First condition output, representing a first condition, in one row may correspond to linear coordinates which overlap (at least in part) with condition second output, representing a second condition, in a second row. As an example of this of FIG. 7B, consider output 752 in row 1, which overlaps with (i.e., occupies a column in common with) output 758 in row 3. Such overlap indicates that the conditions represented by outputs 752 and 758 have linear coordinates which overlap (at least in part) with each other. The outputs 752 and 758 are contained in different rows of the display output 750 because the conditions represented by the outputs 752 and 758 differ in one or more parameters (and/or parameter values). For example, the output 752 may correspond to a first condition having a first root cause, and the output 758 may correspond to a second condition having a second root cause. Displaying such differing conditions using distinct condition output (namely, the outputs 752 and 758) provides a clear visual indication that such conditions would benefit from separate attention.

Figure 7C:
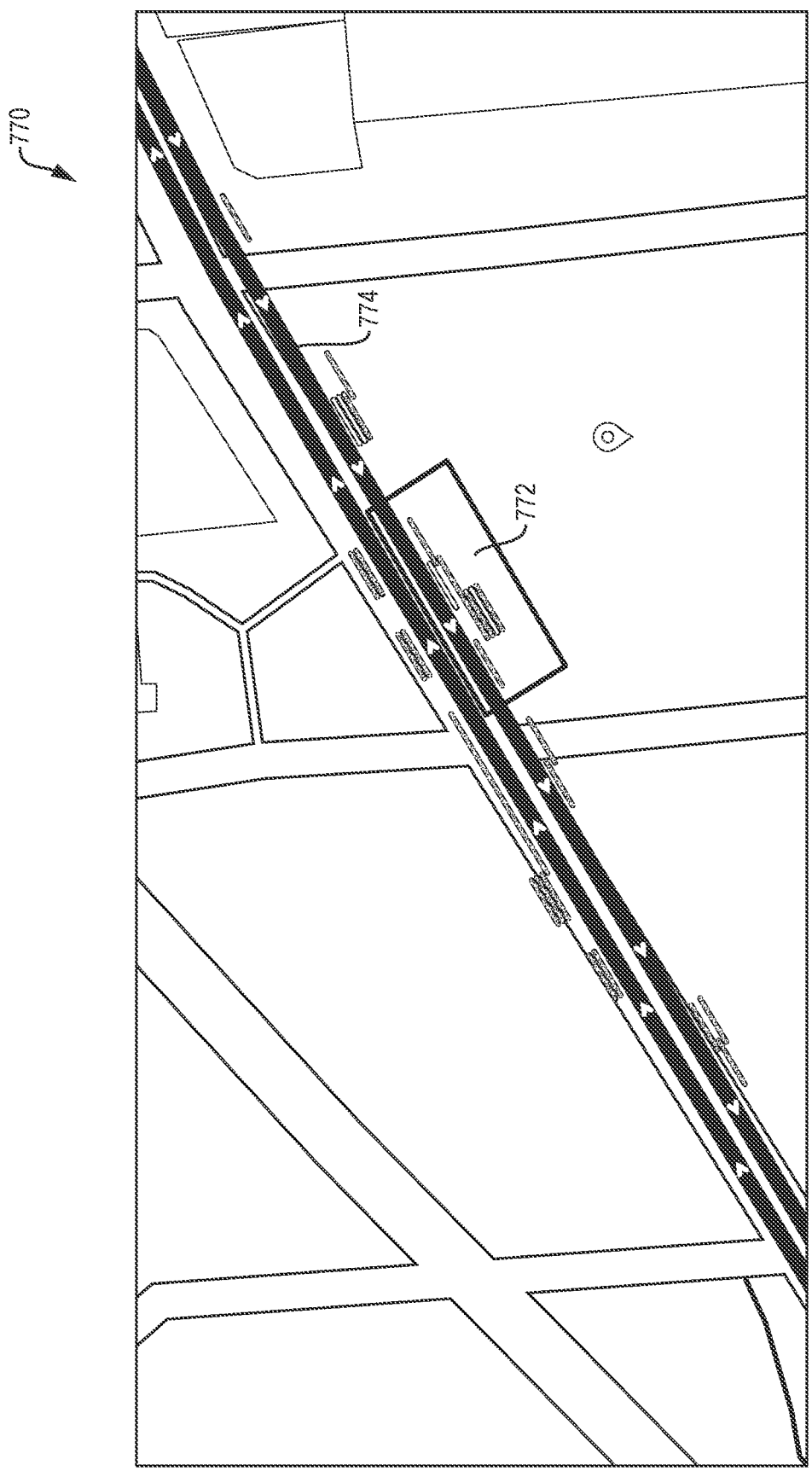
FIG. 7C is an illustration of display output representing a linear asset and a plurality of conditions along the linear asset according to one embodiment of the present invention.

The display output 750 may be contained within output which also includes output representing the linear asset. output 750 FIG. 7C is an illustration of display output representing a linear asset and a plurality of conditions along the linear asset according to one embodiment of the present invention.

For example, FIG. 7C shows display output 770, which includes both output 772 (which is equivalent to the display output 750 of FIG. 7B) representing condition data and output 774 representing the linear asset 202. As such, the display output 770 is an example of the combined output 524 of FIG. 5.

Returning now to the system 500 of FIG. 5 and the method 600 of FIG. 6, the system 500 includes linear asset data 502, which may include any of the data relating to the linear asset 202, such as the location-aligned data channels 222. More generally, the linear asset data 502 may include any data which enables locations of the linear asset 202 to be displayed on a display device (such as a computer monitor of any kind). The system 500 also includes a linear asset output module 506, which generates linear asset output 508 based on the linear asset data 502. The linear asset output module 506 may, for example, display the linear asset output 508 on a display device. Output 702 in FIG. 7A and output 774 in FIG. 7C are examples of the linear asset output 508.

The system 500 also includes condition data 504. Merely for ease of illustration and explanation, the condition data 504 includes first condition data 510a, representing a first condition, and second condition data 510b, representing a second condition. The first condition data 510a may include one or more first condition data units, and the second condition data 510b may include one or more second condition data units. Although only two condition data units 510a and 510b are shown in FIG. 5, the condition data 504 may include any number of condition data units representing any number of conditions.

The method 600 may initialize a set of output rows, such as by creating one empty output row (FIG. 6, operation 602). The method 600 may enter a loop over each condition C represented by the condition data 504 (e.g., over first condition data 510a and second condition data 510b) (FIG. 6, operation 604). The condition being iterated over in the current iteration of this loop is referred to herein as "the current condition D" or "the condition D."

The method 600 may iterate over the conditions C in any order. As merely one example, the method 600 may iterate over the conditions C in order of the values of a time parameter associated with the conditions C, such as a time at which the conditions C were measured, detected, or stored. As this implies, the resulting rows generated by the method 600 may be arranged in an order that corresponds to times associated with conditions represented by those rows. As a particular example, in FIG. 7B, the conditions represented by outputs 752 and 754 in Row #1 may represent conditions associated with an earlier time or times than the condition(s) represented by output 756 in Row #2.

The method 600 may enter a loop over each row R in the output rows (FIG. 6, operation 606). The row being iterated over in the current iteration of this loop is referred to herein as "the current row R" or "the row R."

The system 500 includes a grouping module 512, which receives the condition data 504 as input, and determines whether the current condition C overlaps (e.g., in a linear coordinate system) with an existing condition in the current row R (FIG. 6, operation 608). The grouping module 512 may make this determination, for example, using linear coordinates of the current condition C (e.g., the range of linear coordinates between the start and end of the current condition D) and linear coordinates of existing conditions in the output rows. The grouping module 512 may, for example, consider the current condition C to overlap with an existing condition in the current row R if any location within condition C is within some threshold distance of any location within the existing condition in the current row R. In such embodiments, the current condition C may be considered to overlap with the existing condition in the current row R even if those two conditions do not have any locations in common, so long as each condition contains at least one location that is within the threshold distance of the other condition. This is merely one example of a way in which the grouping module 512 may determine overlap.

If the grouping module 512 determines that the current condition C does not overlap with any existing condition in the current row R, then the grouping module 512 adds the current condition C to the current row R (FIG. 6, operation 610), and proceeds to the next iteration (if any) of the loop over the output rows R, without adding condition C to row R (FIG. 6, operation 616). (The terms "adding" and "assigning" a condition to a row are both used interchangeably herein.)

If, instead, the grouping module 512 determines that the current condition C does overlap with an existing condition in the current row R, then the grouping module 512 determines whether the current condition C satisfies a grouping criterion relative to the existing condition in the current row R (FIG. 6, operation 612). The grouping criterion may take any of a variety of forms. For example, the grouping criterion may be satisfied if the current condition C and the existing condition in the current row R satisfy any one or more of the following sub-conditions, in any combination:
  Their time values are the same time, or are within an amount of time that is less than some predetermined threshold amount or that otherwise satisfies a predetermined temporal condition.
  Their priorities are the same, or differ from each other by less than some predetermined threshold amount.
  They are on the same line.
  They are on the same track.
  They are related to the same linear asset, or to the same linear asset and to the same component of that linear asset.
  Their locations are the same, or overlap, or are within no more than some predetermined threshold distance of each other.
  They have the same condition type, or their condition types both satisfy some common criterion.
  They have the same problem type, or their problem types both satisfy some common criterion.
  They have the same root cause type, or their root cause types both satisfy some common criterion.
  They have the same symptom type, or their symptom types both satisfy some common criterion.

If the grouping module 512 determines that the current condition C satisfies the grouping criterion relative to the existing condition in the current row R, then the grouping module 512 may combine the current condition C with the existing condition in row R (which includes assigning condition C to row R) (FIG. 6, operation 614). Combining such conditions may include, for example, taking the union of the coordinates of condition C and the existing condition in row R and using that union as the coordinates of the resulting combined condition.

If the grouping module 512 determines that the current condition C does not satisfy the grouping criterion with the existing condition in the current row R, then the grouping module 512 proceeds to the next iteration (if any) of the loop over the output rows R, without adding condition C to row R (FIG. 6, operation 616).

Once the grouping module 512 has finished iterating over all of the output rows, the grouping module 512 determines whether the current condition C has been added to any of the output rows (FIG. 6, operation 618). If the grouping module 512 determines that the current condition C has not been added to any of the output rows, then the grouping module 512 adds a new row to the output rows and adds condition C to the newly-added row (FIG. 6, operation 620), and processing to the next iteration (if any) of the loop over the output rows R (FIG. 6, operation 622). Once the method 600 has iterated over all of the conditions and rows, the method 600 ends.

The result of the method 600 is to produce condition grouping output 514, which includes the rows generated by the method 600, as described above. Each such row includes one or more conditions. The display output 750 shown in FIG. 7B represents an example of output generated based on the condition grouping output 514.

The system 500 also includes a condition output module 516, which receives the condition grouping output 514 and generates, based on the condition grouping output 514, the combined condition data output 520. For example, the display output 772 in FIG. 7C is an example of the combined condition data output 520.

As illustrated in the examples of FIG. 7A and FIG. 7C, the linear asset output module 506 and the condition output module 516 (which may, in practice, be implemented as a single output module) may generate the linear asset output 508 and the combined condition data output 520 to display visual output representing any particular condition (such as any of the line segments in visual output 772) at one or more on-screen positions which are near the one or more on-screen positions of the visual output representing the portion of the linear asset 202 that contains the condition. For example, if a particular condition is located between linear coordinates A and B on linear asset 202, then the condition output module 516 may generate visual output (e.g., the first condition data output 522a) representing the particular condition, where that visual output is located on-screen near the visual output representing the portion of linear asset 202 that is between linear coordinates A and B. In the particular example of FIG. 7C, the line segment representing any particular condition is displayed to the side of, parallel with, and offset from, the visual output representing the portion of the linear asset 202 that contains the particular condition.

As described above, condition data output (e.g., condition data output 522a and/or 522b) may include one or a plurality of line segments, which may be connected to each other end-to-end. The resulting plurality of line segments may, for example, approximate a non-linear curve. Condition data output representing a particular condition may be displayed near a corresponding portion of output representing the linear asset 202, and may have the same curvature as that corresponding portion of output, or otherwise track the curvature of that corresponding portion of output. Condition output 704 in FIG. 7A illustrates an example of this. As can be seen from that example, the condition output 704 is displayed near, and is offset from, the corresponding portion of the linear asset output 702, and has a curvature which is the same as, or which otherwise tracks, the curvature of the corresponding portion of the linear asset output 702 (i.e., the portion of the linear asset output 702 that is adjacent to the condition output 704). This makes it easy for a user to quickly identify the portion of the linear asset that corresponds to the condition represented by condition output 704.

As the above description makes clear, the system 500 and method 600 generate the combined output 524, which includes both a visual representation of the linear asset 202 (i.e., the linear asset output 508) and a visual representation of a plurality of conditions (i.e., the combined condition data output 520). The visual representation of the plurality of conditions may combine similar conditions together into individual line segments (or contiguous line segments), and may represent noncontiguous conditions using non-contiguous line segments in a single row of the visual representation. The visual representation of the plurality of conditions may separate conditions that have overlapping linear coordinates into line segments in separate, stacked rows. The result is a visual representation, such as the ones shown in FIGS. 7B and 7C, which immediately and clearly visually indicate the locations and characteristics of conditions in a visually compact manner.

Note that the system 500 and method 600 may display even a single condition (e.g., the condition represented by the first condition data 510a or the condition represented by the second condition data 510b) using a plurality of line segments (e.g., contiguous and/or adjacent line segments). For example, the condition output module 516 may identify, for each of the conditions represented by the condition grouping output 514, one or a plurality of line segments corresponding to locations of that condition, and generate, in the combined condition data output 520, a plurality of visual representations of each such line segment. The result is a visual representation of each condition in the condition grouping output 514, where each such visual representation includes one or a plurality of line segments.

Such visual representations may be generated, for example, as follows. The condition output module 516 may include, or otherwise have access to, data representing locations of markers (e.g., monuments) along the linear asset 202 (such as locations of the monuments 110a-c in FIG. 1). Such data are referred to herein as a "chain marker database," and may take any form (whether or not a database). A particular example of such a chain marker database is illustrated by the table below:

| Line | Track | Marker | Offset | Latitude | Longitude |
|------|-------|--------|--------|----------|-----------|
| City | 1 | 740 | 0 | 38.5059601966 | −77.1120286835 |
| City | 1 | 740 | 25 | 38.5059224728 | −77.1121019697 |
| City | 1 | 740 | 50 | 38.505884748 | −77.1121752559 |
| City | 1 | 740 | 75 | 38.5058470241 | −77.9172485419 |
| City | 1 | 741 | 0 | 38.5058092992 | −77.1123218279 |
| City | 1 | 741 | 25 | 38.5057715752 | −77.917395115 |
| City | 1 | 741 | 50 | 38.5057338503 | −77.9174684008 |
| City | 1 | 741 | 75 | 38.5056961262 | −77.9175416865 |
| City | 1 | 742 | 0 | 38.5056584011 | −77.9176149722 |
| City | 1 | 742 | 25 | 38.505620677 | −77.9176882578 |
| City | 1 | 742 | 50 | 38.5055829518 | −77.9177615433 |
| City | 1 | 742 | 75 | 38.5055452356 | −77.9178348357 |
| City | 1 | 743 | 0 | 38.5055075365 | −77.9179081441 |
| City | 1 | 743 | 25 | 38.5054699076 | −77.9179815089 |
| City | 1 | 743 | 50 | 38.5054323371 | −77.9180549244 |
| City | 1 | 743 | 75 | 38.5053949124 | −77.9181284596 |

Each row in the table above is a record in the chain marker database, representing coordinates at a particular offset from a particular marker. More specifically, in the table above, the columns contain the following data for the corresponding marker/offset combination:

Line: The line (e.g., train line) containing the marker.
Track: The track (e.g., train track) containing the marker.
Marker: A marker identifier (ID) of the marker.
Offset: An offset (e.g., in linear units, such as feet) from the marker identified by the marker ID. If one were to start at the marker specified by the marker ID on the line specified by the Line column and the track specified by the Track column, and travel further along that linear asset by the number of linear units specified by the offset, the resulting location is the location specified by the marker/offset combination.
Latitude: The latitude of the location specified by the marker/offset combination.
Longitude: The longitude of the location specified by the marker/offset combination.

The particular columns shown in the table above are merely examples, and do not constitute limitations of the present invention. More generally, the chain marker database may include any information which enables the condition output module 516 to identify locations of conditions on the linear asset 202.

As described above, the condition data 504 may, for each condition, include data representing a start location and an end location of that condition (e.g., by using a marker/offset combination for each of the start location and end location). The condition output module 516 may use such start location and end location data, in combination with a chain marker database (such as the one illustrated in the table above) to generate one or a plurality of line segments to represent the condition, and to display such line segments on a display device.

For example, for a particular condition D, the condition output module 516 may use condition D's condition data (e.g., within the condition data 504 or within the condition grouping output 514) to identify condition D's start location and end location. The condition output module 516 may identify, within the chain marker database, one or a plurality of records that represent locations which are between condition D's start location and end location. The condition output module 516 may generate, for each consecutive pair of such records within the chain marker database, a line segment connecting the location (e.g., latitude and longitude) of the first pair in the record to the location (e.g., latitude and longitude) of the second pair in the record. The condition output module 516 may generate output, on a display device, representing the resulting plurality of line segments.

The condition data may represent condition D's start location and end location in a first location referencing system (e.g., a linear location referencing system, such as by using marker/offset combinations), and the chain marker database (and resulting line segments) may represent coordinates of marker/offset combinations in a second location reference system (e.g., a two- or three-dimensional coordinate location referencing system, such as one using latitude/longitude combinations). The chain marker database may link coordinates in the first location referencing system to coordinates in the second location referencing system, thereby enabling the condition output module 516 to translate from the first location referencing system to the second location referencing system.

Consider, as a particular example, a condition having a start location of marker 640 and offset 25, and an end location of marker 641 and offset 0. In this case, the condition output module 516 may identify rows 2, 3, 4, and 5 of the chain marker database illustrated by the table above as representing locations which are between condition D's start location and end location. As a result of this identification, the condition output module 516 may generate the following line segments:

A first line segment from the location indicated by row 2 (i.e., latitude 38.5059224728, longitude −77.1121019697) to the location indicated by row 3 (i.e., latitude 38.505884748, longitude −77.1121752559).

A second line segment from the location indicated by row 3 (i.e., latitude 38.505884748, longitude −77.1121752559) to the location indicated by row 4 (i.e., latitude 38.5058470241, longitude −77.9172485419).

A third line segment from the location indicated by row 4 (i.e., latitude 38.5058470241, longitude −77.9172485419) to the location indicated by row 5 (i.e., latitude 38.5058092992, longitude −77.1123218279).

The condition output module 516 may generate visual output representing such line segments on a display device. As described above, visual output 704 in FIG. 7A is an example of such visual output. As further described above, the condition output module 516 may use values of parameters of the condition to select one or more visual characteristics (e.g., colors), and may generate the visual output to have the selected visual characteristic(s).

Although in certain examples described above, the outputs representing conditions (e.g., outputs 752-764 in FIG. 7B) indicate locations, severities, and/or priorities of such conditions, these are merely examples and not limitations of the present invention. More generally, for example:

Any individual condition output may represent one or more values of any one or more conditions. For example, a single condition output may represent values of two conditions simultaneously, such as by using color to represent the value of one parameter (e.g., priority), and by using text to represent the value of another parameter (e.g., time).

Any two condition outputs may represent values of two different parameters. For example, one condition output may represent a value of a first parameter (e.g., priority) of a condition, and a second output may represent a value of a second parameter (e.g., time) of the same condition. Both such condition outputs may be displayed simultaneously. This is generalizable to any number of conditions and corresponding parameters.

Figure 7D:
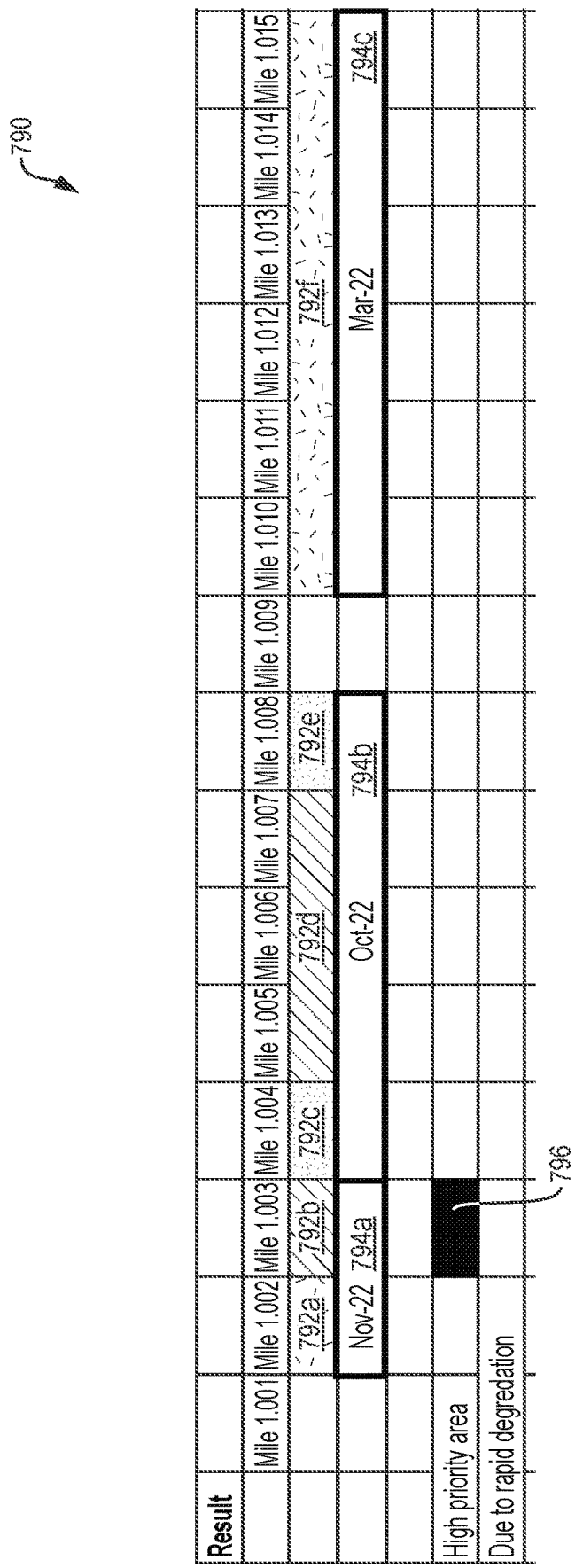
FIG. 7D is an illustration of display output representing values of a priority parameter and of a time parameter of a plurality of conditions according to one embodiment of the present invention.

An example of the latter feature is shown in FIG. 7D, which shows illustration of display output 790 representing values of a severity parameter and of a time parameter of a plurality of conditions according to one embodiment of the present invention. In the particular example of FIG. 7D, the display output 790 includes:

Condition outputs 792*a-f*, each of which represents a severity of one or more corresponding conditions using shades of gray, where a first shade represents a first (e.g., low) severity, a second shade represents a second (e.g., medium) severity, and a third shade represents a third (e.g., high) severity.

Condition outputs 794*a-c*, each of which uses text to represent an age (e.g., month and year) of one or more assets or components.

In the example of FIG. 7D, the horizontal axis corresponds to distance along the linear asset 202. As illustrated in FIG. 7D, each of the condition outputs 794*a-c* displaying a month-year combination represents a particular linear asset (or component or portion of a linear asset) is positioned below one or more corresponding condition outputs representing conditions that are located at the same locations on the linear asset as the condition represented by the corresponding one of the condition outputs 794*a-c*. More specifically:

Condition output 794*a*, which represents a first linear asset (or a first portion or component of a linear asset) that has an age of (e.g., was created or installed in) November 2022, is positioned below condition outputs 792*a-b*, which represent conditions located within the first linear asset (or first portion or component of the linear asset).

Condition output 794*b*, which represents a second linear asset (or a second portion or component of a linear asset) that has an age of (e.g., was created or installed in) October 2022, is positioned below condition outputs 792*c-e*, which represent conditions located within the second linear asset (or second portion or component of the linear asset).

Condition output 794*c*, which represents a third linear asset (or a third portion or component of a linear asset) that has an age of (e.g., was created or installed in) March 2022, is positioned below condition output 792*f*, which represents a condition located within the third linear asset (or third portion or component of the linear asset).

This is merely one example of the general feature described above, namely that the display output 790 may include condition outputs representing different parameters, which, in the case of FIG. 7D, are the parameters of severity (for condition outputs 792*a-f*) and time (for condition outputs 794*a-c*). More generally, embodiments of the present invention may generate display output representing any number of parameters of any number of conditions, in any combination. The condition outputs within such display output may be displayed according to a common linear referencing system, so that each condition output, representing a corresponding condition, is displayed at a position within that linear referencing system that corresponds to the location of the condition, regardless of which parameter is represented by that condition output. As a result, and as shown in the example of FIG. 7D, condition outputs representing values of different parameters may be aligned with each other visually by their locations, so that the locations of values of different parameters may be easily identified by visually inspecting the display output.

As further described above, the repair identification module 224 may increase the value of the "priority" attribute of a particular condition based on a function of that particular condition and one or more other conditions. As a particular example, consider again the display output 790 of FIG. 7D. In this example, the repair identification module 224 has searched for, and identified, any condition data units representing conditions which: (1) have a high severity; and (2) have an age that dates back to November 2022 or later, thereby representing a relatively new asset (or asset portion or component) that has quickly degraded since November 2022, and therefore is likely in need of rapid repair and/or other attention. In the particular example of FIG. 7D, only the condition data unit corresponding to condition output 792*b* satisfies these two criteria. As a result, in this example, the repair identification module 224 has increased the value of the priority attribute of the condition represented by condition output 792*b* to high, which is represented by the black color of condition output 796. This may be displayed or trigger another activity or database (i.e. create a work order record in a database).

This example, in which the repair identification module 224 derives or otherwise modifies the value of the priority parameter of a condition data unit based on the value of one or more other parameters, is merely an example of the more general feature described above, according to which the repair identification module 224 may determine whether two or more condition data units satisfy one or more predetermined criteria and:

in response to determining that the two or more condition data units satisfy the one or more predetermined criteria, modifying (e.g., increasing) the values of the priority attribute of the two or more condition data units, such as by setting those values to some predetermined value (e.g., high priority) or by increasing those values by some amount or percentage;

in response to not determining that the two or more condition data units satisfy the one or more predetermined criteria, not modifying the values of the priority attribute of the two or more condition data units.

The condition output module 516 may then generate a condition output representing the values of the priority attributes of the two or more condition data units. FIG. 7D illustrates an example of this. As illustrated in the example of FIG. 7D, the condition output module 516 may generate condition output representing only the values of the priority attribute of any condition data units whose priority attributes were changed (e.g., increased) as a result of the process described above. Only generating such output may emphasize the priority of such condition data units. Alternatively, for example, the condition output module 516 may generate condition output representing the values of the priority attribute of all condition data units within the location range currently being displayed (e.g., the condition data units represented by condition outputs 792*a-f* in FIG. 7D).

Any of the output referred to herein as "display output" and/or disclosed as being displayed on a display device (e.g., outputs 700, 750, 770, and 790) may, additionally or alternatively, be output to a computer system (e.g., hardware and/or software), such as by providing such output to a software application via an Application Program Interface (API) or other suitable mechanism. As this implies, such output may, for example, be provided only to a computer system, and not be displayed on a display device. As a particular example of this, output representing a priority of a condition (such as output 796) may be provided to a computer system (e.g., a software application), such as for the purpose of adding that condition to a work order or to flag that condition for high-priority treatment, whether or not that output is displayed on a display device in the manner shown in FIG. 7D or otherwise.

Furthermore, embodiments of the present invention need not generate all of the outputs disclosed herein in combination with each other. As a particular example, in the embodiment of FIG. 7D, the display output 790 includes: (1) condition outputs 792*a-f*, each of which represents a value of a severity parameter of a corresponding condition of a linear asset; (2) condition outputs 794*a-c*, each of which represents a value of an age parameter of a corresponding condition of the linear asset; and (3) condition output 796, which represents a value of a priority parameter of a corresponding condition of the linear asset. As described above, the value of the priority parameter of the condition represented by condition output 796 may be derived by embodiments of the present invention from values of one or more other parameters of the same condition (e.g., the values of the severity and age parameters of that condition). Although, in the example of FIG. 7D, the condition output module 516 outputs condition output representing values of the severity, age, and priority parameters, this is not a requirement of the present invention. Alternatively, for example, the condition output module 516 may only output (e.g., display on a display device or provide to a computer system) condition output representing value(s) of the priority parameter of one or more conditions. This may be particularly useful, for example, in embodiments in which the condition output module 516 provides output directly to a computer system (e.g., software application), instead of providing visual output on a display device, in which case it may not be necessary or useful to provide condition output representing values of intermediate parameters, such as severity and age.

Each of the outputs 792*a-f*, 794*a-c*, and 796 is an example of the repair indication 226 shown in FIG. 2. As this implies, the condition output 796, which represents a priority of a corresponding condition, is merely an example of a condition output which may be generated and output (e.g., to a user and/or to a computer system) by the repair identification module 224, whether by itself or in combination with other condition outputs. As another example, the repair identification module 224 may generate, as an example of the repair indication 226, a condition output representing a repair action recommended to be performed in connection with the linear asset 202 (or a component or other portion of the linear asset 202). The repair identification module 224 may generate such a condition output based on any of the data disclosed herein, such as a priority of one or more condition data units. The repair identification module 224 may generate any number of such condition outputs representing corresponding repair actions. As described above, the repair identification module 224 may, for example, output (e.g., display) such condition output representing repair action(s) in combination with condition output representing other parameters of conditions (e.g., age, severity, and/or priority), or may display only such condition output representing repair action(s) (i.e., without also displaying condition output representing other parameters of conditions), thereby providing output (e.g., a report) representing repair actions to be taken in connection with the linear asset 202 (or a component or other portion of the linear asset 202). Such output may be filtered, e.g., by time, such as by filtering the output to only show repair actions recommended to be performed on the current date or other date or date range.

In some embodiments, the techniques described herein relate to a method for measuring a condition of a linear asset, the method performed by at least one computer processor executing computer program instructions stored on at least one non-transitory computer-readable medium, the method including: (A) for each of a plurality of traversals of the linear asset: for each of a plurality of parameters: for each of a plurality of places along the linear asset: (1) obtaining a corresponding measurement of the parameter for that place; and (2) capturing data representing a location of that place; thereby generating, for each of the plurality of parameters, a corresponding survey channel for each of the plurality of traversals, wherein each survey channel includes measurements and corresponding locations for the corresponding parameter and traversal; and a plurality of data channels, wherein each data channel corresponds to a distinct one of the plurality of parameters and includes a plurality of survey channels; (B) aligning, within each of the plurality of data channels, measurements from each of the data channel's plurality of survey channels with each other; (C) aligning measurements from the plurality of data channels with the plurality of places; and (D) based on the measurements, identifying at least one location along the linear asset at which a repair is indicated.

Operation (B) may include generating, for each of the plurality of data channels, a level of certainty associated with the data channel based on a degree of alignment of survey channels in the data channel.

Operation (C) may include aligning the measurements from the plurality of aligned data channels with the plurality of places based on data obtained from known characteristics of the plurality of places at known locations. The known characteristics may include a plurality of signs, monuments, or physical items at the plurality of places. Operation (C) may further include using an image rendering sensor to capture a plurality of images of the plurality of signs, monuments, or physical items, and wherein the data obtained from the plurality of places at the known locations includes the plurality of images. The method may further include identifying and recording locations of the plurality of signs, monuments or physical items. The known characteristics may include a plurality signal-generating tags at the plurality of places, and (C) may further include using a signal-generating tag reader to read a plurality of signal-generating tag signals from the plurality of signal-generating tags, and the data obtained from the plurality of at the known locations may includes the plurality of signal-generating tag signals.

Operation (B) may be performed before operation (C). Operation (C) may be performed before operation (B).

Obtaining the corresponding measurement may include using a sensor to obtain the corresponding measurement. Examples of the sensor include an ultrasonic sensor, a ground penetrating radar sensor, a camera, and an accelerometer.

Capturing the data representing the location of that place may include capturing the location using a GPS module, capturing the location using an odometer that measures the location based on a distance of the location from a reference location, and/or capturing the location using reckoning of a known location using at least one sensor.

Operation (A) may includes: traversing the linear asset using a moving surveying vehicle having a first data capture module and a second data capture module onboard; wherein the first data capture module captures a first one of the plurality of data channels; and wherein the second data capture module captures a second one of the plurality of data channels.

The method may further include synchronizing the first one of the plurality of data channels and the second one of the plurality of data channels using time stamps in the first and second one of the plurality of data channels.

Operation (A) may include: traversing the linear asset using a moving surveying vehicle having a data capture module onboard; wherein the data capture module captures a first one of the plurality of data channels; and wherein the data capture module captures a second one of the plurality of data channels.

Operation (D) may include: (D)(1) identifying, based on at least one first measurement in the plurality of data channels, first condition data representing a first condition; (D)(2) identifying, based on at least one second measurement in the plurality of data channels, second condition data representing a second condition in the plurality of data channels; (D)(3) determining whether a location of the first condition data and a location of the second condition data satisfy a proximity criterion relative to each other; and (D)(4) in response to determining that the location of the first condition data and the location of the second condition data satisfy the proximity criterion relative to each other, identifying a location of the first condition data and/or a location of the second condition data as a location at which a repair is indicated.

The method may further include: in response to determining that the location of the first condition data and the location of the second condition data satisfy the proximity criterion relative to each other, increasing a value of a priority attribute of the first condition data and increasing a value of a priority attribute of the second condition data.

The method may further include: generating output in response to increasing the value of the priority attribute of the first condition data and increasing the value of the priority attribute of the second condition data.

The method may further include: generating, on a display device, linear asset visual output representing the linear asset; wherein generating the output includes generating the output adjacent to the linear asset visual output.

The method may further include: determining whether the first condition data and the second condition data satisfy a non-location similarity condition relative to each other; and (D)(4) may include: in response to determining that the location of the first condition data and the location of the second condition data satisfy the proximity criterion relative to each other, identifying a location of the first condition data and/or a location of the second condition data as a location at which a repair is indicated.

The location of the first condition data may be stored according to a first location referencing system, and the location of the second condition data may be stored according to a second location referencing system.

In some embodiments, the techniques described herein relate to a system including at least one non-transitory computer-readable medium having computer program instructions stored thereon, the computer program instructions being executable by at least one processor to perform a method for measuring a condition of a linear asset, the method including: (A) for each of a plurality of traversals of the linear asset: for each of a plurality of parameters: for each of a plurality of places along the linear asset: (1) obtaining a corresponding measurement of the parameter for that place; and (2) capturing data representing a location of that place; thereby generating, for each of the plurality of parameters, a corresponding survey channel for each of the plurality of traversals, wherein each survey channel includes measurements and corresponding locations for the corresponding parameter and traversal; and a plurality of data channels, wherein each data channel corresponds to a distinct one of the plurality of parameters and includes a plurality of survey channels; (B) aligning, within each of the plurality of data channels, measurements from each of the data channel's plurality of survey channels with each other; (C) aligning measurements from the plurality of data channels with the plurality of places; and (D) based on the measurements, identifying at least one location along the linear asset at which a repair is indicated.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may gather data automatically using any of a variety of sensors, align locations of such data automatically, and automatically identify locations requiring repair or replacement. Such functions are inherently rooted in computer technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method for measuring a condition of a linear asset, the method performed by at least one computer processor executing computer program instructions stored on at least one non-transitory computer-readable medium, the method comprising:
 (A) for each of a plurality of traversals of the linear asset:
  for each of a plurality of parameters:
   for each of a plurality of places along the linear asset:
    (1) obtaining a corresponding measurement of the parameter for that place; and (2) capturing data representing a location of that place;

thereby generating, for each of the plurality of parameters, a corresponding survey channel for each of the plurality of traversals, wherein each survey channel comprises measurements and corresponding locations for the corresponding parameter and traversal; and a plurality of data channels, wherein each data channel corresponds to a distinct one of the plurality of parameters and comprises a plurality of survey channels;

(B) aligning, within each of the plurality of data channels, measurements from each of the data channel's plurality of survey channels with each other by: (1) dividing the measurements from each of the data channel's plurality of survey channels into a plurality of segments; (2) shrinking at least some of the plurality of segments; and (3) stretching at least some of the plurality of segments;

(C) aligning measurements from the plurality of data channels with the plurality of places based on data obtained from known characteristics of the plurality of places at known locations, wherein the known characteristics comprise a plurality of signs, monuments, poles, signal-generating tags, vertical curves, horizontal curves, altitude, tunnel start locations, tunnel locations, train stations, or station platforms at the plurality of places; and (D) based on the measurements, identifying at least one location along the linear asset at which a repair is indicated.

2. The method of claim 1, wherein (B) comprises generating, for each of the plurality of data channels, a level of certainty associated with the data channel based on a degree of alignment of survey channels in the data channel.

3. The method of claim 1, wherein (C) further comprises using an image rendering sensor to capture a plurality of images of the plurality of signs, monuments or physical items, and wherein the data obtained from the plurality of places at the known locations comprises the plurality of images.

4. The method of claim 3, further comprising identifying and recording locations of the plurality of signs, monuments or physical items.

5. The method of claim 1, wherein the known characteristics comprise a plurality signal-generating tags at the plurality of places, wherein (C) further comprises using a signal-generating tag reader to read a plurality of signal-generating tag signals from the plurality of signal-generating tags, and wherein the data obtained from the plurality of at the known locations comprises the plurality of signal-generating tag signals.

6. The method of claim 1, wherein (B) is performed before (C).

7. The method of claim 1, wherein (C) is performed before (B).

8. The method of claim 1, wherein obtaining the corresponding measurement comprises using a sensor to obtain the corresponding measurement.

9. The method of claim 8, wherein obtaining the corresponding measurement comprises using ultrasonic sensors to obtain the corresponding measurement.

10. The method of claim 8, wherein obtaining the corresponding measurement comprises using ground penetrating radar to obtain the corresponding measurement.

11. The method of claim 8, wherein obtaining the corresponding measurement comprises using a camera to obtain the corresponding measurement.

12. The method of claim 8, wherein obtaining the corresponding measurement comprises using an accelerometer to obtain the corresponding measurement.

13. The method of claim 1, wherein capturing the data representing the location of that place comprises capturing the location using a GPS module.

14. The method of claim 1, wherein capturing the data representing the location of that place comprises capturing the location using an odometer that measures the location based on a distance of the location from a reference location.

15. The method of claim 1, wherein capturing the data representing the location of that place comprises capturing the location using reckoning of a known location using at least one sensor.

16. The method of claim 1, wherein (A) comprises:
traversing the linear asset using a moving surveying vehicle having a first data capture module and a second data capture module onboard;
wherein the first data capture module captures a first one of the plurality of data channels; and
wherein the second data capture module captures a second one of the plurality of data channels.

17. The method of claim 16, further comprising synchronizing the first one of the plurality of data channels and the second one of the plurality of data channels using time stamps in the first and second one of the plurality of data channels.

18. The method of claim 1, wherein (A) comprises:
traversing the linear asset using a moving surveying vehicle having a data capture module onboard;
wherein the data capture module captures a first one of the plurality of data channels; and
wherein the data capture module captures a second one of the plurality of data channels.

19. The method of claim 1, wherein (D) comprises:
(D)(1) identifying, based on at least one first measurement in the plurality of data channels, first condition data representing a first condition;
(D)(2) identifying, based on at least one second measurement in the plurality of data channels, second condition data representing a second condition in the plurality of data channels;
(D)(3) determining whether a location of the first condition data and a location of the second condition data satisfy a proximity criterion relative to each other; and
(D)(4) in response to determining that the location of the first condition data and the location of the second condition data satisfy the proximity criterion relative to each other, identifying a location of the first condition data and/or a location of the second condition data as a location at which a repair is indicated.

20. The method of claim 19, further comprising:
in response to determining that the location of the first condition data and the location of the second condition data satisfy the proximity criterion relative to each other, increasing a value of a priority attribute of the first condition data and increasing a value of a priority attribute of the second condition data.

21. The method of claim 20, further comprising:
generating output in response to increasing the value of the priority attribute of the first condition data and increasing the value of the priority attribute of the second condition data.

22. The method of claim 21, further comprising:
generating, on a display device, linear asset visual output representing the linear asset;

wherein generating the output comprises generating the output adjacent to the linear asset visual output.

23. The method of claim 19, further comprising:
determining whether the first condition data and the second condition data satisfy a non-location similarity condition relative to each other; and
wherein (D)(4) comprises: in response to determining that the location of the first condition data and the location of the second condition data satisfy the proximity criterion relative to each other, identifying a location of the first condition data and/or a location of the second condition data as a location at which a repair is indicated.

24. The method of claim 19, wherein the location of the first condition data is stored according to a first location referencing system, and wherein the location of the second condition data is stored according to a second location referencing system.

25. A system comprising at least one non-transitory computer-readable medium having computer program instructions stored thereon, the computer program instructions being executable by at least one processor to perform a method for measuring a condition of a linear asset, the method comprising:
(A) for each of a plurality of traversals of the linear asset:
  for each of a plurality of parameters:
    for each of a plurality of places along the linear asset:
      (1) obtaining a corresponding measurement of the parameter for that place; and (2) capturing data representing a location of that place;
  thereby generating, for each of the plurality of parameters, a corresponding survey channel for each of the plurality of traversals, wherein each survey channel comprises measurements and corresponding locations for the corresponding parameter and traversal; and a plurality of data channels, wherein each data channel corresponds to a distinct one of the plurality of parameters and comprises a plurality of survey channels;
(B) aligning, within each of the plurality of data channels, measurements from each of the data channel's plurality of survey channels with each other by: (1) dividing the measurements from each of the data channel's plurality of survey channels into a plurality of segments; (2) shrinking at least some of the plurality of segments; and (3) stretching at least some of the plurality of segments;
(C) aligning measurements from the plurality of data channels with the plurality of places based on data obtained from known characteristics of the plurality of places at known locations, wherein the known characteristics comprise a plurality of signs, monuments, poles, signal-generating tags, vertical curves, horizontal curves, altitude, tunnel start locations, tunnel locations, train stations, or station platforms at the plurality of places; and
(D) based on the measurements, identifying at least one location along the linear asset at which a repair is indicated.

* * * * *